US011853118B2

(12) United States Patent
Behar et al.

(10) Patent No.: US 11,853,118 B2
(45) Date of Patent: *Dec. 26, 2023

(54) PORTABLE COMPUTER WITH MULTIPLE DISPLAY CONFIGURATIONS

(71) Applicant: LiTL LLC, Boston, MA (US)

(72) Inventors: Yves Behar, Oakland, CA (US); Joshua Morenstein, San Francisco, CA (US); Christopher Hibmacronan, Oakland, CA (US); Naoya Edahiro, San Francisco, CA (US); Matthew David Day, San Francisco, CA (US)

(73) Assignee: LiTL LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/997,718

(22) Filed: Aug. 19, 2020

(65) Prior Publication Data

US 2021/0034104 A1      Feb. 4, 2021

Related U.S. Application Data

(63) Continuation of application No. 16/374,569, filed on Apr. 3, 2019, now Pat. No. 10,782,733, which is a
(Continued)

(51) Int. Cl.
*G06F 1/16*       (2006.01)
*G06F 3/0481*     (2022.01)
(Continued)

(52) U.S. Cl.
CPC .......... *G06F 1/1616* (2013.01); *G06F 1/1601* (2013.01); *G06F 1/162* (2013.01);
(Continued)

(58) Field of Classification Search
CPC .... G06F 1/1615; G06F 1/1616; G06F 1/1618; G06F 1/1622; G06F 1/162
See application file for complete search history.

(56) References Cited

U.S. PATENT DOCUMENTS

| 3,468,576 A | 9/1969 | Beyer et al. |
| 4,939,514 A | 7/1990 | Miyazaki |

(Continued)

FOREIGN PATENT DOCUMENTS

| CN | 1292112 A | 4/2001 |
| CN | 2627170 Y | 7/2004 |

(Continued)

OTHER PUBLICATIONS

IPR Case No. IPR2021-00681, Mar. 18, 2021, *Lenovo Inc. v. Litl, LLC.*

(Continued)

*Primary Examiner* — Adrian S Wilson
(74) *Attorney, Agent, or Firm* — Wolf, Greenfield & Sacks, P.C.

(57) ABSTRACT

A portable computer that is configurable between a plurality of display modes including a laptop mode (in which the portable computer has a conventional laptop appearance) and an easel mode in which the base of the computer and its display component stand vertically forming an inverted "V." The portable computer includes a hinge assembly that couples the display component to the base of the computer, and allows the display component to be rotated about an axis along an interface between the display component and the base to configure the portable computer between a closed position, the laptop mode and the easel mode.

24 Claims, 25 Drawing Sheets

Related U.S. Application Data continuation of application No. 15/896,201, filed on Feb. 14, 2018, now Pat. No. 10,289,154, which is a continuation of application No. 15/394,492, filed on Dec. 29, 2016, now Pat. No. 9,927,835, which is a continuation of application No. 13/651,636, filed on Oct. 15, 2012, now Pat. No. 9,563,229, which is a continuation of application No. 12/170,951, filed on Jul. 10, 2008, now Pat. No. 8,624,844, and a continuation of application No. 12/170,939, filed on Jul. 10, 2008, now Pat. No. 8,289,688.

(60) Provisional application No. 61/041,365, filed on Apr. 1, 2008.

(51) Int. Cl.
G06F 3/04812 (2022.01)
G06F 3/0482 (2013.01)

(52) U.S. Cl.
CPC ............ G06F 1/169 (2013.01); G06F 1/1613 (2013.01); G06F 1/1618 (2013.01); G06F 1/1637 (2013.01); G06F 1/1662 (2013.01); G06F 1/1677 (2013.01); G06F 1/1681 (2013.01); G06F 3/0481 (2013.01); G06F 3/0482 (2013.01); G06F 3/04812 (2013.01); G06F 2200/1614 (2013.01)

(56) References Cited

U.S. PATENT DOCUMENTS

| | | |
|---|---|---|
| D333,636 S | 3/1993 | Issa |
| 5,200,913 A | 4/1993 | Hawkins et al. |
| 5,268,817 A | 12/1993 | Miyagawa et al. |
| 5,436,954 A | 7/1995 | Nishiyama et al. |
| 5,515,345 A | 5/1996 | Barreira et al. |
| 5,547,698 A | 8/1996 | Lansbergen et al. |
| 5,559,670 A | 9/1996 | Flint et al. |
| 5,610,992 A | 3/1997 | Hickman |
| 5,644,516 A | 7/1997 | Podwalny et al. |
| 5,646,820 A | 7/1997 | Honda et al. |
| 5,661,632 A | 8/1997 | Register |
| 5,682,290 A | 10/1997 | Markow et al. |
| 5,708,561 A | 1/1998 | Huilgol et al. |
| 5,712,760 A | 1/1998 | Coulon et al. |
| D391,927 S | 3/1998 | Faranda et al. |
| D392,944 S | 3/1998 | Issa |
| D395,868 S | 7/1998 | Lino |
| 5,790,371 A | 8/1998 | Latocha et al. |
| 5,793,355 A | 8/1998 | Youens |
| 5,796,575 A | 8/1998 | Podwalny et al. |
| D399,526 S | 10/1998 | Brady |
| 5,825,352 A | 10/1998 | Bisset et al. |
| 5,841,631 A | 11/1998 | Shin et al. |
| 5,847,698 A | 12/1998 | Reavey et al. |
| 5,900,848 A | 5/1999 | Haneda et al. |
| 5,903,723 A | 5/1999 | Beck et al. |
| 5,926,364 A | 7/1999 | Karidis |
| 5,949,643 A | 9/1999 | Batio |
| D416,003 S | 11/1999 | Schiefer et al. |
| 5,986,634 A | 11/1999 | Alioshin et al. |
| 5,987,704 A | 11/1999 | Tang |
| 6,005,767 A | 12/1999 | Ku et al. |
| 6,067,224 A | 5/2000 | Nobuchi |
| 6,094,191 A | 7/2000 | Watanabe et al. |
| 6,097,389 A | 8/2000 | Morris et al. |
| 6,137,468 A | 10/2000 | Martinez |
| 6,144,358 A | 11/2000 | Narayanaswamy et al. |
| 6,154,359 A * | 11/2000 | Kamikakai ........... G06F 1/1618 |
| | | 16/342 |
| 6,188,391 B1 | 2/2001 | Seely et al. |
| 6,222,507 B1 | 4/2001 | Gouko |
| 6,223,393 B1 | 5/2001 | Knopf |
| 6,243,258 B1 | 6/2001 | Paratore |
| 6,262,885 B1 | 7/2001 | Emma et al. |
| 6,266,236 B1 | 7/2001 | Ku et al. |
| 6,275,376 B1 | 8/2001 | Moon |
| 6,295,038 B1 | 9/2001 | Rebeske |
| 6,302,612 B1 | 10/2001 | Fowler et al. |
| 6,323,846 B1 | 11/2001 | Westerman et al. |
| D452,238 S | 12/2001 | Sugano et al. |
| 6,327,482 B1 | 12/2001 | Miyashita |
| 6,341,061 B1 | 1/2002 | Eisbach et al. |
| 6,343,006 B1 | 1/2002 | Moscovitch et al. |
| 6,377,444 B1 | 4/2002 | Price et al. |
| 6,396,419 B1 | 5/2002 | Yeh |
| D462,069 S | 8/2002 | Gatto |
| 6,437,974 B1 | 8/2002 | Liu |
| 6,449,146 B1 | 9/2002 | Ryuuzaki |
| D463,797 S | 10/2002 | Andre et al. |
| 6,464,195 B1 | 10/2002 | Hildebrandt |
| 6,492,974 B1 | 12/2002 | Nobuchi et al. |
| 6,493,216 B1 | 12/2002 | Lin |
| 6,510,049 B2 | 1/2003 | Rosen |
| D476,326 S | 6/2003 | Taniumura |
| 6,597,384 B1 | 7/2003 | Harrison |
| D479,708 S | 9/2003 | Hwang et al. |
| 6,628,267 B2 | 9/2003 | Karidis et al. |
| 6,642,909 B1 | 11/2003 | Oliva |
| 6,659,516 B2 | 12/2003 | Wang et al. |
| 6,661,426 B1 | 12/2003 | Jetha et al. |
| 6,665,175 B1 | 12/2003 | DeBoer et al. |
| 6,693,652 B1 | 2/2004 | Barrus et al. |
| 6,697,055 B1 | 2/2004 | Bullister |
| 6,704,007 B1 | 3/2004 | Clapper |
| 6,711,004 B2 | 3/2004 | Yen et al. |
| 6,724,365 B1 | 4/2004 | Escamilla et al. |
| D491,177 S | 6/2004 | Andre et al. |
| D491,936 S | 6/2004 | Jao |
| 6,760,721 B1 | 7/2004 | Chasen et al. |
| D494,162 S | 8/2004 | Kondo |
| 6,771,494 B2 | 8/2004 | Shimano |
| D495,674 S | 9/2004 | Yoo et al. |
| D495,694 S | 9/2004 | Chase et al. |
| 6,788,527 B2 | 9/2004 | Doczy et al. |
| 6,807,053 B2 | 10/2004 | An et al. |
| 6,819,304 B2 | 11/2004 | Branson |
| 6,829,140 B2 | 12/2004 | Shimano et al. |
| 6,859,219 B1 | 2/2005 | Sall |
| D504,128 S | 4/2005 | Maskatia |
| 6,882,335 B2 * | 4/2005 | Saarinen ............. G06F 1/1605 |
| | | 345/156 |
| 6,918,159 B2 | 7/2005 | Choi |
| 6,944,012 B2 | 9/2005 | Doczy et al. |
| 6,963,485 B2 | 11/2005 | Hong |
| D512,997 S | 12/2005 | Lee et al. |
| 6,972,752 B2 | 12/2005 | Nako et al. |
| D513,509 S | 1/2006 | Kawa |
| D516,552 S | 3/2006 | Iseki |
| D517,541 S | 3/2006 | Maskatia |
| D518,042 S | 3/2006 | Kanayama |
| 7,035,665 B2 | 4/2006 | Kido et al. |
| D523,429 S | 6/2006 | Lin |
| 7,058,902 B2 | 6/2006 | Iwema et al. |
| 7,061,472 B1 | 6/2006 | Schweizer et al. |
| 7,072,179 B1 | 7/2006 | Curran et al. |
| D528,541 S | 9/2006 | Maskatia |
| D528,993 S | 9/2006 | Wilson |
| 7,138,962 B2 | 11/2006 | Koenig |
| 7,148,877 B2 | 12/2006 | Chang et al. |
| D534,531 S | 1/2007 | Ogasawara |
| D535,292 S | 1/2007 | Shi et al. |
| 7,164,432 B1 | 1/2007 | Amemiya |
| 7,187,364 B2 | 3/2007 | Duarte et al. |
| D544,846 S | 6/2007 | Kindle et al. |
| 7,239,508 B2 | 7/2007 | Ferrucei |
| 7,243,079 B1 | 7/2007 | Manolis et al. |
| 7,250,207 B1 | 7/2007 | Heal et al. |
| 7,337,671 B2 | 3/2008 | Ayazi et al. |
| 7,366,994 B2 | 4/2008 | Loui |
| 7,382,607 B2 | 6/2008 | Skillman |
| 7,428,142 B1 | 9/2008 | Ligtenberg et al. |

(56) References Cited

U.S. PATENT DOCUMENTS

| | | |
|---|---|---|
| 7,433,179 B2 | 10/2008 | Hisano et al. |
| D581,371 S | 11/2008 | Richmond |
| 7,467,356 B2 | 12/2008 | Gettman et al. |
| 7,522,946 B2 | 4/2009 | Im |
| D593,085 S | 5/2009 | Behar et al. |
| D593,086 S | 5/2009 | Behar et al. |
| D593,091 S | 5/2009 | Behar et al. |
| D605,635 S | 12/2009 | Edahiro et al. |
| 7,698,407 B2 | 4/2010 | Mattox, Jr. et al. |
| 7,756,928 B1 | 7/2010 | Meenan et al. |
| 7,778,973 B2 | 8/2010 | Choi et al. |
| 7,814,425 B1 | 10/2010 | O'Shaugnessy et al. |
| 7,869,834 B2 | 1/2011 | Seol et al. |
| 7,970,240 B1 | 6/2011 | Chao et al. |
| 8,145,222 B2 | 3/2012 | Wormald et al. |
| 8,151,105 B2 | 4/2012 | Park et al. |
| 8,217,964 B2 | 7/2012 | Laine et al. |
| 8,284,714 B2 | 10/2012 | Ray |
| 8,289,688 B2 * | 10/2012 | Behar .................. G06F 1/1601 361/679.3 |
| 8,300,022 B2 | 10/2012 | Brenneman |
| 8,385,950 B1 | 2/2013 | Wagner et al. |
| 8,464,161 B2 | 6/2013 | Giles et al. |
| 8,577,957 B2 | 11/2013 | Behar et al. |
| 8,612,888 B2 | 12/2013 | Pennington et al. |
| 8,624,844 B2 * | 1/2014 | Behar .................. G06F 1/1618 345/169 |
| 9,003,315 B2 | 4/2015 | Behar et al. |
| 9,495,070 B2 | 11/2016 | Pennington et al. |
| 9,563,229 B2 * | 2/2017 | Behar .................. G06F 3/0481 |
| 9,880,715 B2 * | 1/2018 | Behar .................. G06F 3/0484 |
| 9,927,835 B2 * | 3/2018 | Behar .................. G06F 1/1677 |
| 10,289,154 B2 * | 5/2019 | Behar .................. G06F 1/1601 |
| 10,564,818 B2 | 2/2020 | Behar et al. |
| 10,684,743 B2 | 6/2020 | Havoc Pennington et al. |
| 10,782,733 B2 * | 9/2020 | Behar .................. G06F 1/1662 |
| 2001/0032320 A1 | 10/2001 | Abdelnur et al. |
| 2002/0005818 A1 | 1/2002 | Bruzzone |
| 2002/0010707 A1 | 1/2002 | Chang et al. |
| 2002/0021258 A1 | 2/2002 | Koenig |
| 2002/0190947 A1 | 12/2002 | Feinstein |
| 2003/0048595 A1 | 3/2003 | Hsieh et al. |
| 2003/0080995 A1 | 5/2003 | Tenenbaum et al. |
| 2003/0107603 A1 | 6/2003 | Clapper |
| 2003/0109232 A1 | 6/2003 | Park et al. |
| 2003/0203747 A1 | 10/2003 | Nagamine |
| 2004/0001049 A1 | 1/2004 | Oakley |
| 2004/0025993 A1 | 2/2004 | Russell |
| 2004/0150635 A1 | 8/2004 | Clapper |
| 2004/0172451 A1 | 9/2004 | Biggs et al. |
| 2004/0185920 A1 | 9/2004 | Choi et al. |
| 2004/0189694 A1 | 9/2004 | Kurtz et al. |
| 2004/0203535 A1 | 10/2004 | Kim et al. |
| 2004/0207568 A1 | 10/2004 | Ooshima et al. |
| 2004/0212602 A1 | 10/2004 | Nako et al. |
| 2004/0228076 A1 | 11/2004 | Clapper |
| 2004/0230663 A1 | 11/2004 | Ackerman |
| 2005/0005241 A1 | 1/2005 | Hunleth et al. |
| 2005/0010860 A1 | 1/2005 | Weiss et al. |
| 2005/0018396 A1 | 1/2005 | Nakajima et al. |
| 2005/0041378 A1 | 2/2005 | Hamada et al. |
| 2005/0055632 A1 | 3/2005 | Schwartz et al. |
| 2005/0060655 A1 | 3/2005 | Gray et al. |
| 2005/0062715 A1 * | 3/2005 | Tsuji .................. G06F 1/1677 345/158 |
| 2005/0063145 A1 | 3/2005 | Homer et al. |
| 2005/0065932 A1 | 3/2005 | Rocha |
| 2005/0071782 A1 | 3/2005 | Barrett et al. |
| 2005/0083642 A1 | 4/2005 | Senpuku et al. |
| 2005/0091343 A1 | 4/2005 | Murray, Jr. |
| 2005/0091596 A1 | 4/2005 | Anthony et al. |
| 2005/0093868 A1 | 5/2005 | Hinckley |
| 2005/0110880 A1 | 5/2005 | Parulski et al. |
| 2005/0120082 A1 | 6/2005 | Hesselink et al. |
| 2005/0122318 A1 * | 6/2005 | Tonouchi .................. G06F 1/162 345/179 |
| 2005/0128695 A1 | 6/2005 | Han |
| 2005/0134717 A1 * | 6/2005 | Misawa .................. H04N 5/2252 348/333.06 |
| 2005/0146845 A1 | 7/2005 | Moscovitch |
| 2005/0155184 A1 | 7/2005 | Kayl |
| 2005/0177798 A1 | 8/2005 | Thomson et al. |
| 2005/0210399 A1 | 9/2005 | Filner et al. |
| 2005/0221865 A1 | 10/2005 | Nishiyama et al. |
| 2005/0257400 A1 | 11/2005 | Sommerer et al. |
| 2005/0282596 A1 | 12/2005 | Park et al. |
| 2006/0007503 A1 | 1/2006 | Nakamura |
| 2006/0015823 A1 | 1/2006 | Chao et al. |
| 2006/0017692 A1 | 1/2006 | Wehrenberg et al. |
| 2006/0034042 A1 * | 2/2006 | Hisano .................. G06F 1/1656 361/679.04 |
| 2006/0082554 A1 | 4/2006 | Caine et al. |
| 2006/0101064 A1 | 5/2006 | Strong et al. |
| 2006/0123353 A1 | 6/2006 | Matthews et al. |
| 2006/0126284 A1 | 6/2006 | Moscovitch |
| 2006/0209016 A1 | 9/2006 | Fox et al. |
| 2006/0238439 A1 | 10/2006 | Fuller et al. |
| 2006/0264243 A1 * | 11/2006 | Aarras .................. G06F 1/1643 455/566 |
| 2006/0265390 A1 | 11/2006 | Aldrich et al. |
| 2006/0268500 A1 | 11/2006 | Kuhn |
| 2006/0271644 A1 | 11/2006 | Yamaizumi et al. |
| 2006/0277167 A1 | 12/2006 | Gross et al. |
| 2007/0013674 A1 | 1/2007 | Woolley |
| 2007/0013682 A1 | 1/2007 | Lin et al. |
| 2007/0024722 A1 | 2/2007 | Eura et al. |
| 2007/0035616 A1 | 2/2007 | Lee |
| 2007/0038549 A1 | 2/2007 | Janowski et al. |
| 2007/0058329 A1 | 3/2007 | Ledbetter et al. |
| 2007/0073833 A1 | 3/2007 | Roy et al. |
| 2007/0118525 A1 | 5/2007 | Svendsen |
| 2007/0120762 A1 | 5/2007 | O'Gorman |
| 2007/0138806 A1 | 6/2007 | Ligtenberg et al. |
| 2007/0178952 A1 | 8/2007 | Ehara et al. |
| 2007/0182663 A1 | 8/2007 | Biech |
| 2007/0198674 A1 | 8/2007 | Li et al. |
| 2007/0240076 A1 | 10/2007 | Astala et al. |
| 2007/0242421 A1 | 10/2007 | Goschin et al. |
| 2007/0247446 A1 | 10/2007 | Orsley et al. |
| 2007/0268202 A1 | 11/2007 | Lim et al. |
| 2007/0296820 A1 | 12/2007 | Lonn |
| 2008/0022229 A1 | 1/2008 | Bhumkar et al. |
| 2008/0024388 A1 | 1/2008 | Bruce |
| 2008/0024465 A1 | 1/2008 | Hawkins et al. |
| 2008/0042987 A1 | 2/2008 | Westerman et al. |
| 2008/0059888 A1 | 3/2008 | Dunko |
| 2008/0062625 A1 | 3/2008 | Batio |
| 2008/0074831 A1 | 3/2008 | Lee et al. |
| 2008/0088602 A1 | 4/2008 | Hotelling |
| 2008/0092039 A1 | 4/2008 | Brockway et al. |
| 2008/0122796 A1 | 5/2008 | Jobs et al. |
| 2008/0134093 A1 | 6/2008 | Dharmarajan et al. |
| 2008/0158795 A1 | 7/2008 | Aoki et al. |
| 2008/0174570 A1 | 7/2008 | Jobs et al. |
| 2008/0195664 A1 | 8/2008 | Maharajh et al. |
| 2008/0209493 A1 | 8/2008 | Choi et al. |
| 2008/0211778 A1 | 9/2008 | Ording et al. |
| 2008/0235594 A1 | 9/2008 | Bhumkar et al. |
| 2008/0284738 A1 | 11/2008 | Hovden et al. |
| 2009/0007001 A1 | 1/2009 | Morin et al. |
| 2009/0019383 A1 | 1/2009 | Riley et al. |
| 2009/0019479 A1 | 1/2009 | Kwak et al. |
| 2009/0150784 A1 | 6/2009 | Denney et al. |
| 2009/0150826 A1 | 6/2009 | Lyndersay et al. |
| 2009/0160811 A1 | 6/2009 | Motoe et al. |
| 2009/0190295 A1 | 7/2009 | Chin et al. |
| 2009/0193364 A1 | 7/2009 | Jarrett et al. |
| 2009/0244012 A1 | 10/2009 | Behar et al. |
| 2009/0244016 A1 * | 10/2009 | Casparian .................. G06F 1/1692 345/173 |
| 2009/0244832 A1 | 10/2009 | Behar et al. |
| 2009/0249244 A1 | 10/2009 | Robinson et al. |
| 2009/0275366 A1 | 11/2009 | Schilling |

(56) References Cited

U.S. PATENT DOCUMENTS

| | | | |
|---|---|---|---|
| 2009/0300511 A1 | 12/2009 | Behar et al. | |
| 2009/0303205 A1 | 12/2009 | Seibert | |
| 2009/0303676 A1 | 12/2009 | Behar et al. | |
| 2009/0322790 A1 | 12/2009 | Behar et al. | |
| 2010/0016018 A1 | 1/2010 | Okuda et al. | |
| 2010/0174993 A1 | 7/2010 | Pennington et al. | |
| 2010/0255889 A1 | 10/2010 | Tsutsui et al. | |
| 2011/0279376 A1 | 11/2011 | Tang et al. | |
| 2013/0141854 A1 | 6/2013 | Behar et al. | |
| 2014/0282263 A1 | 9/2014 | Pennington et al. | |
| 2015/0277688 A1 | 10/2015 | Behar et al. | |
| 2017/0090699 A1 | 3/2017 | Havoc Pennington et al. | |
| 2017/0205849 A1 | 7/2017 | Behar et al. | |
| 2018/0181271 A1 | 6/2018 | Behar et al. | |
| 2018/0307271 A1 | 10/2018 | Behar et al. | |
| 2019/0361491 A1 | 11/2019 | Behar et al. | |
| 2020/0249807 A1 | 8/2020 | Behar et al. | |
| 2020/0319759 A1 | 10/2020 | Pennington et al. | |

FOREIGN PATENT DOCUMENTS

| | | | |
|---|---|---|---|
| CN | 1926496 A | | 3/2007 |
| DE | 19952486 A1 | | 5/2001 |
| DE | 10314554 A1 | | 10/2004 |
| EP | 0 588 210 A1 | | 3/1994 |
| EP | 1 316 877 A1 | | 6/2003 |
| EP | 2 283 407 A1 | | 2/2011 |
| GB | 2 321 982 A | | 8/1998 |
| GB | 2449632 A | | 12/2008 |
| JP | 1994-242853 | * | 2/1993 |
| JP | 5-197507 A | | 8/1993 |
| JP | 6090200 A | | 3/1994 |
| JP | 6-242853 A | | 9/1994 |
| JP | 6-259166 A | | 9/1994 |
| JP | 1994-24285 A | | 9/1994 |
| JP | 8-179851 A | | 7/1996 |
| JP | 1996-179851 | * | 7/1996 |
| JP | H08-179851 | | 7/1996 |
| JP | 10-111658 A | | 4/1998 |
| JP | 11-296259 A | | 10/1999 |
| JP | 2001-167211 A | | 6/2001 |
| JP | 2001-298514 A | | 10/2001 |
| JP | 2002-2589252 A | | 9/2002 |
| JP | 2004-302179 A | | 10/2004 |
| JP | 2005-159741 A | | 6/2005 |
| JP | 2005-168036 A | | 6/2005 |
| JP | 2005-242436 A | | 9/2005 |
| JP | 2005-71297 A | | 10/2005 |
| JP | 2006-227409 A | | 8/2006 |
| JP | 2006-243137 A | | 9/2006 |
| KR | 1020000036647 A | | 6/2002 |
| WO | WO 95/24007 A1 | | 9/1995 |

OTHER PUBLICATIONS

U.S. Appl. No. 16/722,760, filed Dec. 20, 2019 Behar et al.
U.S. Appl. No. 16/865,893, filed May 4, 2020, Pennington et al.
EP 9727165.4, Nov. 22, 2016 European, Examination Report.
EP 09727165.4, Nov. 23, 2015, European Office Communication.
PCT/US2009/038599, Jun. 3, 2009, International Search Report and Written Opinion.
EP 09755433.1, Apr. 5, 2011, Extended European Search Report.
EP 09755433.1, Jan. 17, 2017, European Examination Report.
EP 19190053.9, Feb. 3, 2020, Extended European Search Report.
PCT/US2009/39117, Sep. 28, 2009, International Search Report and Written Opinion.
PCT/US2009/39117, Oct. 14, 2010, International Preliminary Report on Patentability.
International Search Report and Written Opinion for International Application No. PCT/US2009/39117 dated Sep. 28, 2009.
International Preliminary Report on Patentability dated Oct. 14, 2010 for International Application No. PCT/US2009/039117.
Office Action dated Jun. 7, 2012, for U.S. Appl. No. 12/170,951.
Extended European Search Report dated Apr. 5, 2011 in connection with European Application No. 09755433.1.
International Search Report and Written Opinion for International Application No. PCT/US2009/038599 dated Jun. 3, 2009.
Japanese Office Action dated Dec. 4, 2012 in connection with Japanese Application No. 2011-503058 and partial English translation thereof.
Japanese Office Action dated Apr. 16, 2013 in connection with Japanese Application No. 2011-503058.
Office Action dated Apr. 4, 2011, for U.S. Appl. No. 12/170,951.
European Office Communication dated Nov. 23, 2015 in connection to European Application No. 09727165.4.
Chinese Office Action dated Jul. 18, 2013 in connection with Chinese Application No. 200980117859.8.
European Examination Report dated Nov. 22, 2016 in connection with European Application No. 09727165.4.
European Examination Report dated Jan. 17, 2017 in connection with European Application No. 09755433.1.
Canadian Office Action dated Aug. 18, 2017 in connection with Canadian Application No. 2719828.
Extended European Search Report dated Feb. 3, 2020 in connection with European Application No. 19190053.9.
http://laptop.org/en/laptop/start/ebook.shtml accessed on Sep. 29, 2008.
Miller, Creating a Digital Home Entertainment System with Windows Media Center. 2006, Que.
European Communication dated Sep. 13, 2021 in connection with European Application No. 19190053.9.
[No Author Listed] Dell Latitude XT Tablet. Dell. Dec. 2007, 17 pages.
[No Author Listed] Environment Variable. Wikipedia. https://en.wikipedia.org/w/index.php?title=Environment_variable&oldid=160448946. Last accessed Mar. 19, 2021, 6 pages.
[No Author Listed] HP Compaq Tablet PC TC1100 QuickSpecs. Hewlett-Packard. Aug. 5, 2005, 24 pages.
[No Author Listed] Is Your "Show Desktop Icon" in XP Missing? WaybackMachine Archive of https://www.windows-help-central.com/show-desktop-icon-in-xp-missing.html. Captured Mar. 2, 2007, 1 page.
[No Author Listed] Lenovo ThinkPad X61 Tablet Service and Troubleshooting Guide. Lenovo. Apr. 2007, 80 pages.
[No Author Listed] Microsoft Digital Image Suite User's Manual. Microsoft Corporation. 2005.
[No Author Listed] Motion Computing M1400 Tablet PC Addendum. Motion Computing, Inc. Jul. 2004; 5 pages.
[No Author Listed] Motion Computing M1400 Tablet PC User Guide. Motion Computing, Inc. Mar. 2004, 89 pages.
[No Author Listed] Panasonic CF-19 Operating Instructions. Panasonic. 2006, 40 pages.
[No Author Listed] Panasonic CF-T8 Operating Instructions. Panasonic. 2008, 40 pages.
[No Author Listed] Sony Vaio VGN-UX280P (UX Series MicroPC) Spec Sheet. Sony Corporation. Aug. 23, 2006, 2 pages.
[No Author Listed] Windows Special Folder. Wikipedia. https://en.wikipedia.org/w/index.php?title=Special_folder&oldid=77102597. Last accessed Mar. 17, 2021, 4 pages.
[No Author Listed], All-New Litl Webbook Debuts at 2010 CES. Cision. Jan. 5, 2010. URL:https://www.prnewswire.com/news-releases/all-new-litl-webbook-debuts-at-2010-ces-80716797.html [last accessed Jun. 25, 2021].
[No Author Listed], Dell Latitude XT Quick Reference Guide. Dec. 2007; 234 pages.
[No Author Listed], Dell Latitude XT User's Guide. May 2008; 248 pages.
[No Author Listed], Designing for Direct Manipulation. Microsoft Corporation. Mar. 3, 2008; 4 pages.
[No Author Listed], Litl Webbook Beats ChromeOS, Becomes First Cloud Computer. CoolThings. Nov. 16, 2009. URL:https://www.coolthings.com/litl-webbook-beats-chromeos-becomes-first-cloud-computer/ [last accessed Jun. 25, 2021].
[No Author Listed], Microsoft Computer Dictionary Fifth Edition. Microsoft Press. 2002; 648 pages.

(56) References Cited

OTHER PUBLICATIONS

[No Author Listed], The Litl webbook. European Consumers Choice. URL=https://www.europeanconsumerschoice.org/hi-tech/litl-webbook-computer-test-and-reviews/ [last accessed Jun. 25, 2021].
[No Author Listed], The Windows Interface Guidelines for Software Design. Microsoft Press. 1995.
[No Author Listed], The Windows Interface Guidelines—A Guide for Designing Software. Microsoft Windows. Microsoft Corporation. Feb. 1995.
[No Author Listed], Toshiba Satellite A300/A300D Satellite Pro A300/A300D Portable Person Computer User's Manual. Toshiba Corporation. 2008; 226 pages.
Bartlett, Rock 'n' Scroll is Here to Stay. Compaq. Western Research Laboratory. 2000; 9 pages.
Clifford et al., Measuring Tilt with Low-g Accelerometers. Sensors. Freescale Semiconductor. Application Note. AN3107. May 2005; 8 pages.
Franks et al., HTTP Authentication: Basic and Digest Access Authentication. The Internet Society. 1999.
Hardy, Lenovo ThinkPad X61 Tablet PC Review. Jun. 12, 2007; 12 pages. tabletpcreview.com/tabletreview/lenovo-thinkpad-x61-tablet-pc-review.
Hinckley et al., Sensing Techniques for Mobile Interaction. ACM UIST 2000. Symposium on User Interface Software and Technology. CHI Letters. 2000; 2(2): 91-100.
Karp et al., Excerpts of Windows XP in a Nutshell Second Edition. O'Reilly Media, Inc. Feb. 2005, 14 pages.
Leonhard, Excerpts of Windows XP Hacks & Mods: For Dummies. Wiley Publishing, Inc. 2005, 46 pages.
McDonald, LiTL Webbook Review. Little Tech Girl. Aug. 31, 2010. URL:https://littletechgirl.com/2010/08/31/litl-webbook-review/ [last accessed Jun. 25, 2021].
Noe, The Litl Webbook: A more social computing device. Nov. 5, 2009. Core77. URL:https://www.core77.com/posts/15122/The-Litl-Webbook-A-more-social-computing-device [last accessed Jun. 25, 2021].
Patent Owner's Preliminary Response. *Lenovo v. Litl LLC.* IPR Case No. IPR2021-00681. U.S. Pat. No. 8,289,688. Jun. 25, 2021.
Petition for Inter Partes Review. *Lenovo (United States) Inc. v. Litl LLC.* IPR Case No. IPR2021-00786/ U.S. Pat. No. 9,880,715. May 4, 2021.
Petition for Inter Partes Review. *Lenovo (United States) Inc. v. Litl LLC.* IPR Case No. IPR2021-00800/ U.S. Pat. No. 10,289,154. May 4, 2021.
Petition for Inter Partes Review. *Lenovo (United States) Inc. v. Litl LLC.* IPR Case No. IPR2021-00821/ U.S. Pat. No. 8,612,888. Apr. 27, 2021.
Petition for Inter Partes Review. *Lenovo (United States) Inc. v. Litl LLC.* IPR Case No. IPR2021-00822/ U.S. Pat. No. 8,624,844. May 4, 2021.
Petition for Inter Partes Review. *Lenovo vs. Litl LLC.* IPR Case No. IPR2021-00681. U.S. Pat. No. 8,289,688. Dated Mar. 18, 2021.
Petition for Inter Partes Review. *Microsoft Corporation v. Litl LLC.* PTAB Case No. IPR2021-01011. U.S. Pat. No. 8,577,957. May 25, 2021.
Pogue, Windows XP Home Edition: The Missing Manual, Second Edition. O'Reilly Media, Inc. Dec. 2004.
Ride, MIT's $100 Laptop. TechPowerUp. Sep. 29, 2005; 4 pages. https://www.techpowerup.com/5512/mits-uds-100-laptop.
Russinovich et al., Microsoft Windows Internals 4th Edition. Microsoft Press. 2005.
Saxena, CES 2010: All New Litl Webbook Makes Its Debut Appearance. Elite Choice. URL:https://elitechoice.org/luxury/ces-2010-all-new-litl-webbook-makes-its-debut-appearance [last accessed Jun. 25, 2021].
Schwartz, Organizing and Editing Your Photos with Picasa. Visual QuickProject Guide. 2005.
Scinto, Introducing The Litl WebBook. The Gadgeteer. Nov. 19, 2009. URL:https://the-gadgeteer.com/2009/11/19/introducing-the-litl-webbook/ [last accessed Jun. 25, 2021].
Strauss, Litl Webbook Re-Defines Computing. ABC News. Dec. 14, 2009. URL:https://abcnews.go.com/Technology/GadgetGuide/litl-webbook-defines-computing/story?id=9311095 [last accessed Jun. 25, 2021].
Canadian Office Action dated Mar. 23, 2022, in connection with Canadian Application No. 3,028,799.
Canadian Office Action dated February dated Feb. 22, 2023, in connection with Canadian Application No. 3,028,799.
Canadian Office Action dated May 29, 2023, in connection with Canadian Application No. 3,158,247.
Decision of Intellectual Property Court of Beijing dated May 25, 2021, in connection with Chinese Application No. 201510977541.4.
Decision of Re-Examination dated Jun. 1, 2021, in connection with Chinese Application No. 201510977541.4.
*LiTL LLC v. Asustek Computer Inc.*, No. 1-23-cv-00122, D.I. 19 (First Amended Complaint) (D. Del. May 1, 2023).
*LiTL LLC v. HP Inc.*, No. 1-23-cv-00120, D.I. 20 (First Amended Complaint) (D. Del. May 3, 2023).
*LiTL LLC v. Dell Technologies Inc.*, No. 1-23-cv-00121, D.I. 18 (First Amended Complaint) (D. Del. May 8, 2023).
[No Author Listed], "Mode". American Heritage Dictionary of the English Language. 6th Edition. 2016. 1 page.
Affidavit of Nathaniel E. Frank-White signed Jan. 26, 2022. 21 pages.
Certified English Translation of JP2005-71297A ("Kanamori").
Certified English Translation of CN 2627170Y ("CN'170") (Ruijiang).
Certified English Translation of JP H6-242853 ("Shimura").
Decision Denying Institution of Inter Partes Review of U.S. Pat. No. 9,880,715 B2, Issued Oct. 21, 2021, *Lenovo (United States), Inc. v. LITL,LLC.* IPR2021-00786, 6 pages.
Decision Denying Institution of Inter Partes Review of U.S. Pat. No. 8,624,844 B2, Issued Oct. 21, 2021, *Lenovo (United States) Inc. v. Litl LLC*, IPR2021-00822 (PTAB). 15 pages.
Declaration of Christopher M. Schmandt signed Feb. 24, 2022. 156 pages.
Declaration of Dan Fauxsmith signed Jan. 27, 2022. 5 pages.
Disclaimer in Patent Under 37 CFR 1.321(a) dated Jun. 17, 2021, in connection with U.S. Pat. No. 8,289,688.
File History Excerpts of European Application No. 09727165.4 Patented as EP 2283407 B1. 49 pages.
File History of U.S. Pat. No. 8,624,844 issued on Jan. 7, 2014. 1439 pages.
First Amended Complaint. *LITL LLC v. Lenovo (United States), Inc. et al.* No. DDE-1-20-cv-00689 (U.S. Dist. Ct., Dist. Delaware). 165 pages.
King, Litl Webbook price drops from $699 to $399. ZDNet. May 16, 2010 URL: https://www.zdnet.com/article/litl-webbook-price-drops-from-699-to-399 4 pages.
Murph, Little Webbook plummets from $699 to $399, still can't catch an eye. May 16, 2010. 3 pages.
Office Action dated Apr. 4, 2011, U.S. Appl. No. 12/170,951.
Patent Owner's Preliminary Response. *Lenovo v. Litl LLC.* IPR Case No. IPR2021-100786. U.S. Pat. No. 9,880,715.
Pogue, Windows Vista: The Missing Manual, 1st edition, 2nd printing, published Feb. 2007. Pogue Press. O'Reilly. Excerpts. 120 pages.
Request for Ex Parte Reexamination Under 35. U.S.C. 302-307 and 37 C.F.R. 1.510 dated May 24, 2022, in connection with U.S. Pat. No. 8,624,844.
Request for Ex Parte Reexamination Under 35. U.S.C. 302-307 and 37 C.F.R. 1.510 dated Feb. 25, 2022, in connection with U.S. Pat. No. 8,289,688.
Request for Ex Parte Reexamination Under 35. U.S.C. 302-307 and 37 CPR. 1.510 dated Feb. 16, 2022, in connection with U.S. Pat. No. 9,880,715.

\* cited by examiner

PORTABLE COMPUTER WITH MULTIPLE DISPLAY CONFIGURATIONS

RELATED APPLICATIONS

This application is a Continuation of U.S. application Ser. No. 16/374,569, filed Apr. 3, 2019, entitled "PORTABLE COMPUTER WITH MULTIPLE DISPLAY CONFIGURATIONS", which is a Continuation of U.S. application Ser. No. 15/896,201, filed Feb. 14, 2018, entitled "PORTABLE COMPUTER WITH MULTIPLE DISPLAY CONFIGURATIONS", which is a Continuation of U.S. application Ser. No. 15/394,492, filed Dec. 29, 2016, entitled "PORTABLE COMPUTER WITH MULTIPLE DISPLAY CONFIGURATIONS", which is a Continuation of U.S. application Ser. No. 13/651,636, filed Oct. 15, 2012, entitled "PORTABLE COMPUTER WITH MULTIPLE DISPLAY CONFIGURATIONS", which is a Continuation of U.S. application Ser. No. 12/170,939, filed Jul. 10, 2008, entitled "PORTABLE COMPUTER WITH MULTIPLE DISPLAY CONFIGURATIONS", which is a Non-Provisional of Provisional (35 USC 119(e)) of U.S. Application Ser. No. 61/041,365, filed Apr. 1, 2008, entitled "PORTABLE COMPUTER WITH MULTIPLE DISPLAY CONFIGURATIONS". Application Ser. No. 13/651,636 is a Continuation of U.S. application Ser. No. 12/170,951, filed Jul. 10, 2008, entitled "PORTABLE COMPUTER WITH MULTIPLE DISPLAY CONFIGURATIONS", which is a Non-Provisional of Provisional (35 USC 119(e)) of U.S. Application Ser. No. 61/041,365, filed Apr. 1, 2008, entitled "PORTABLE COMPUTER WITH MULTIPLE DISPLAY CONFIGURATIONS". The entire contents of these applications are incorporated herein by reference in their entirety.

BACKGROUND

Field of Invention

The present invention relates generally to portable computers and, more particularly, to a portable computer that is configurable into different functional and positional modes.

Discussion of Related Art

Portable computers, such as laptop computers or notebook computers, have become increasingly popular and ubiquitous in the home and workplace. Conventional portable computers most commonly have a "clam-shell" configuration, with a base including the keyboard, various ports, connectors and/or inputs (e.g., for power and connecting peripheral devices), and the majority of the electrical components (e.g., the central processing unit and memory), and a display component pivotably coupled to the base by a hinge. The display component is movable about the hinge between a closed position, with the display screen positioned adjacent the keyboard, and an open position, with the display screen inclined at a desired viewing angle.

Some portable computers are able to accept user inputs via a touch screen in addition to via conventional tools, such as a keyboard or mouse. The use of a touch screen to input data is sometimes referred to as operating in "tablet mode" because the computer is being used in a manner similar to a tablet of paper. U.S. Pat. No. 6,771,494 discloses a hybrid tablet-type portable computer that is capable of operating either as a normal laptop computer receiving user input via a keyboard ("laptop mode"), or as a tablet computer receiving user input via a touch screen. The '494 patent further discloses that the display component of the computer is attached to the base of the computer by hinges that allow the display to be tilted relative to the base (for laptop mode), and to be rotated and folded against the base to configure the computer into tablet mode.

Another variation of a portable computer with a moveable display is disclosed in U.S. Pat. No. 6,266,236. The '236 patent discloses a computer including a base, a display member and an arm assembly coupling the display member to the base. According to the '236 patent, the arm assembly allows pivotable movement of the display member between a plurality of positions, including a notebook mode configuration, a tablet mode configuration, a presentation mode configuration, and a closed mode.

SUMMARY OF INVENTION

Aspects and embodiments of the present invention are directed to a portable computer that is configurable between a laptop mode (in which the portable computer has a conventional laptop appearance) and an easel mode in which the base of the computer and its display component stand upright forming an inverted "V," as discussed further below. The display component is pivotably coupled to the base of the portable computer by a hinge that allows the display component to be rotated or tilted about a longitudinal axis running along an interface between the base and the display component. Unlike the computers discussed in U.S. Pat. Nos. 6,266,236 and 6,771,494 above, the portable computer according to embodiments of the invention does not require an arm assembly, nor multiple, different hinge assemblies to be configured into the different modes. Furthermore, the portable computer according to embodiments of the invention is capable of different display modes and different functionality in the different configurations, as discussed below.

Further aspects and embodiments are directed to a portable computer having an embedded scroll wheel that can be configured to allow a user to control various features and functionality of the portable computer. For example, as discussed further below the scroll wheel can be used to navigate among information displayed on the portable computer's display and/or to alter operating modes of the portable computer, and/or to control features such as volume, display brightness, etc.

According to one embodiment, a portable computer is configurable between various modes, including a closed mode, a laptop mode, an easel mode, a flat mode and a frame mode. The portable computer may comprise a display component including a display screen, a base, and a hinge assembly at least partially housed within the base and configured to pivotably couple the display component to the base. The display component may be rotatable about a longitudinal axis running along an interface between the display component and the base. In the closed mode, the display screen may be disposed substantially against the base, and rotating the display component about the longitudinal axis up to approximately 180 degrees from the closed mode may configure the portable computer into the laptop mode. Rotating the display component about the longitudinal axis beyond approximately 180 degrees axis from the closed mode may configure the portable computer into the easel mode.

In one example of the portable computer, the display component is rotatable about the longitudinal axis up to approximately 320 degrees from the closed mode. In another example, the portable computer comprises a display orientation module that displays content on the display screen in one of a plurality of orientations relative to the longitudinal axis. The orientation of the displayed content may be dependent on the current display mode of the portable computer, or may be configurable responsive to a user input. The portable computer may further comprise a mode sensor which detects a current display mode of the portable computer, and the display orientation module may display content on the display screen in an orientation dependent on the current display mode detected by the mode sensor. Depending on the hinge assembly used, the longitudinal axis may comprises multiple parallel axes, and the hinge assembly may be configured to permit rotation of the display component about any of the multiple parallel axes to configure the portable computer between the plurality of display modes.

Another embodiment is directed to a portable computer comprising a base, a display component rotatably coupled to the base, and means for rotating the display component in a single direction relative to the base to configure the portable computer between a laptop mode and an easel mode.

In another embodiment of a portable computer configurable between multiple modes including a laptop mode and an easel mode, the portable computer comprises a display component, a base, and a hinge assembly configured to rotatably couple the display component to the base. The hinge assembly may be configured to permit rotation of the display component about a single axis to configure the portable computer between the laptop mode and the easel mode. In one example, the single axis is a longitudinal axis running along an interface between the display component and the base. The portable computer may further comprise a scroll wheel disposed at least partially about the longitudinal axis. In one example, the display component comprises a display screen, and the scroll wheel is configured to permit a user to manipulate content displayed on the display screen.

Another embodiment is directed to a method of automatically orienting content displayed on a portable computer. The method comprises rotating a display component of the portable computer about a longitudinal axis running along an interface between the display component and a base of the portable computer, detecting a degree of rotation of the display component relative to the base, providing a signal representative of the degree of rotation of the display component, and automatically configuring an orientation, relative to the longitudinal axis, of the content displayed on the portable computer responsive to the signal.

According to another embodiment, a portable computer comprises a base unit, a display unit including a display screen configured to display content, an orientation sensor which detects an orientation of the display unit relative to the base unit, and a display orientation module which orients the content displayed on the display screen responsive to the orientation detected by the orientation sensor.

Another embodiment of a portable computer comprises a base, a display component rotatably coupled to the base such that the display component and the base are rotatable with respect to one another about a longitudinal axis running along an interface between the display component and the base, the display component including a display screen, and a scroll wheel disposed at least partially within the base and rotatable about the longitudinal axis, the scroll wheel configured to permit a user to control at least one of operating parameters of the portable computer and content displayed on the display screen. In one example, the scroll wheel is configured to permit the user to adjust a volume of sound produced by the portable computer. In another example, the screen is configured to display at least one of a plurality of modes of content, and the scroll wheel is configured to permit the user to select a mode of content for display by the portable computer. The portable computer may further comprise one or more navigation buttons that may be used in conjunction with the scroll wheel to control aspects of the portable computer and displayed content.

According to another embodiment, a portable computer is configurable between a plurality of display modes including a laptop mode and an easel mode, the portable computer comprising a base, a display component rotatably coupled to the base and including a screen which displays content, and a scroll wheel accessible in each of the plurality of display modes and configured to permit a user to manipulate at least one of operating parameters of the portable computer and the content displayed on the screen. In one example, the scroll wheel is disposed at least partially about an axis of rotation of the display component relative to the base.

In another embodiment, a portable computer comprises a base, a display component including a screen configured to display content, a hinge assembly configured to rotatably couple the display component to the base and to permit rotation of the display component about a longitudinal axis running along an interface between the display component and the base, and a scroll wheel disposed at least partially about the longitudinal axis.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment in any manner consistent with the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION

Aspects and embodiments are directed to a portable computer that is configurable between different operating modes, including a laptop mode (in which the portable computer has a conventional laptop appearance), a flat mode, a frame mode, and an easel mode in which the base of the computer and its display component stand vertically forming an inverted "V," as discussed further below. The portable computer is capable of different display formats and functionality in the different modes, and includes a graphical user interface that may work seamlessly with the computer hardware to provide a unified, comfortable, holistic user experience. In particular, the portable computer may provide access to a wide array of functions, both those traditionally provided by computing devices and those traditionally provided by other passive information devices. For example, the hardware and software, including the graphical user interface, of the portable computer may be focused toward providing access to entertainment media, such as audio and video (e.g., playing music, streaming video, viewing photographs, etc.), email, and internet, while also providing state-of-the-art computer processing capability.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments. Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
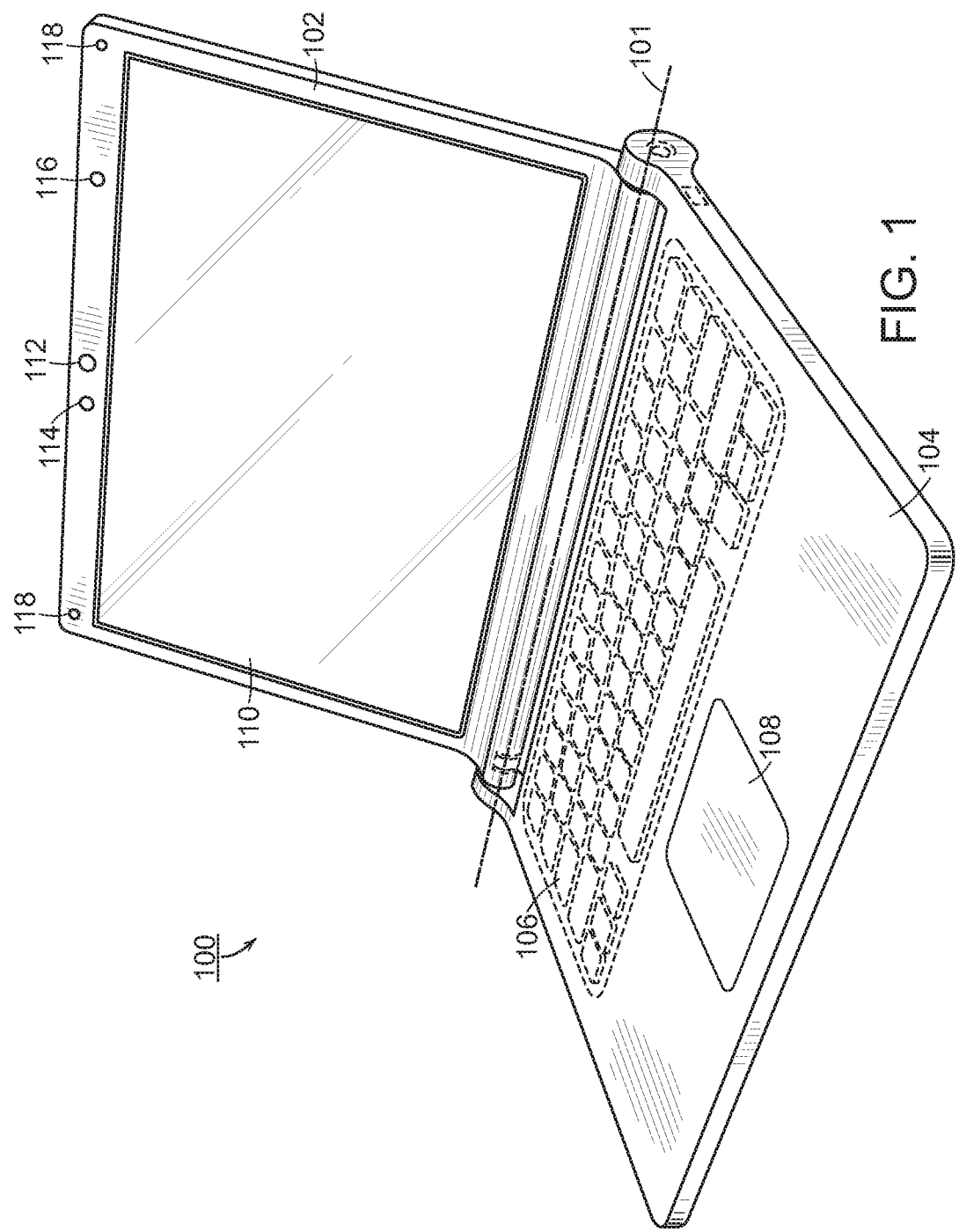
FIG. 1 is an illustration of one example of a portable computer, according to aspects of the invention, in a "laptop" configuration.

Referring to FIG. 1, there is illustrated one example of a portable computer according to aspects of the invention. In FIG. 1, the portable computer 100 is illustrated in the "laptop" mode, with the display component 102 inclined at a viewing angle from the base 104. The display component 102 is pivotably coupled to the base 104 by a hinge assembly (not shown) that allows the display component to be rotated with respect to the base. The hinge assembly may include a single or multiple hinges, which may be any of a variety of hinge types, including, but not limited to single-axis hinges, multiple-axis hinges, geared hinges, etc. In one example, the hinge assembly allows the display component 102 to be rotated (or tilted) about a longitudinal axis 101 running along an interface between the display component and the base 104, as illustrated in FIG. 1 and discussed further below. The base 104 includes a keyboard 106 and internal electronic components (not shown), such as a central processing unit, memory, and other components necessary to operate the portable computer, as known to those skilled in the art. In some embodiments, the base 104 may also include a touch pad 108 or trackball (not shown) for receiving user commands, as known to those skilled in the art.

Still referring to FIG. 1, the display component 102 includes a display screen 110, and may also include a camera 112, microphone 114, and infrared receiver 116, as discussed further below. It is to be appreciated that the locations of the camera 112, microphone 114 and infrared receiver 114 are not limited to the example illustrated in FIG. 1, and may be placed in other locations on the display component 102 and/or base 104, as would be recognized by those skilled in the art. The display component 102 may also include cushions 118 that provide soft contact points between the base 104 and the display component 102 when the portable computer is closed. In one example, the cushions 118 are made of rubber. However, it is to be appreciated that the invention is not so limited, and the cushions 118 may comprise materials other than rubber, including, for example, a polymer, felt, or other suitable materials as would be recognized by those skilled in the art.

Figure 2:
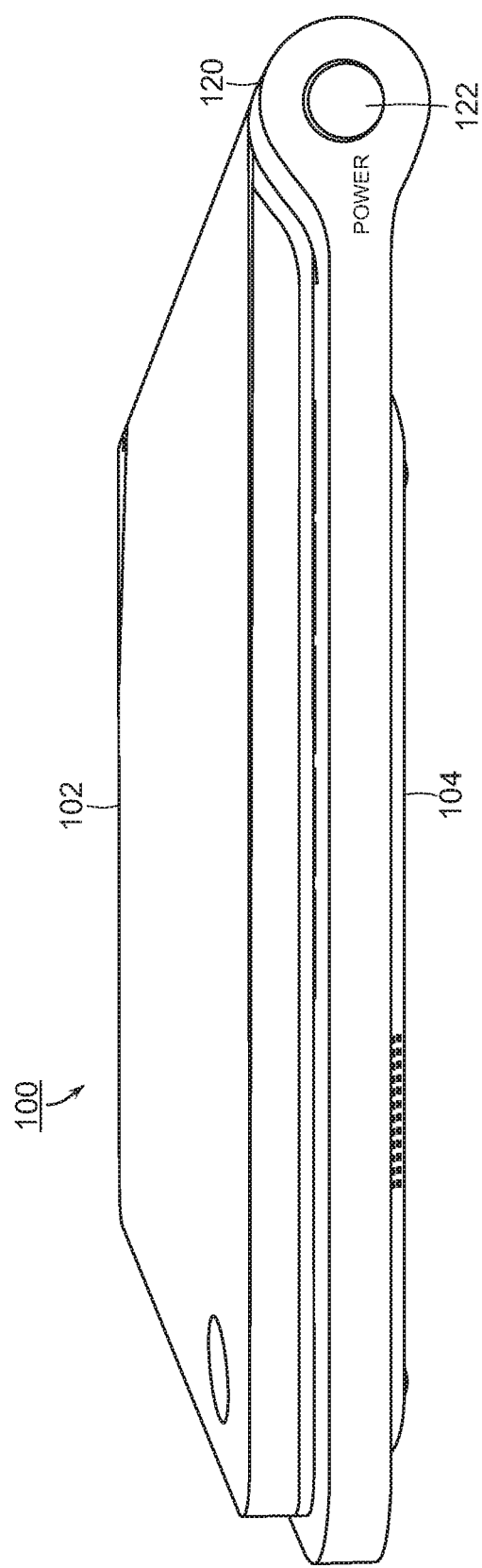
FIG. 2 is a view of the portable computer of FIG. 1 in the closed position.

Referring to FIG. 2, there is illustrated a side view of the portable computer 100 of FIG. 1 in the closed configuration. As is the case for conventional clam-shell type portable computers, when the portable computer 100 is closed, the display screen is disposed "face down" against the keyboard of the base 104. In the illustrated embodiment, the base 104 includes a rounded portion 120 that houses the hinge (not shown) that pivotably couples the display component 102 to the base, as discussed further below. It is to be appreciated that the rounded portion 120 is not limited to having a round shape, but may instead have another shape, which may be dependent on the type of hinge used. In one embodiment, a power button 122, configured to turn the portable computer ON and OFF, may also be provided on the rounded portion 120, as illustrated in FIG. 2. However, it is to be appreciated that the invention is not so limited, and the power button 122 may be located elsewhere on the base 104. In one example, the power button 122 may be slightly recessed relative to the surface of the base 104, so as decrease the potential for the power button to be accidentally pressed.

Figure 3:
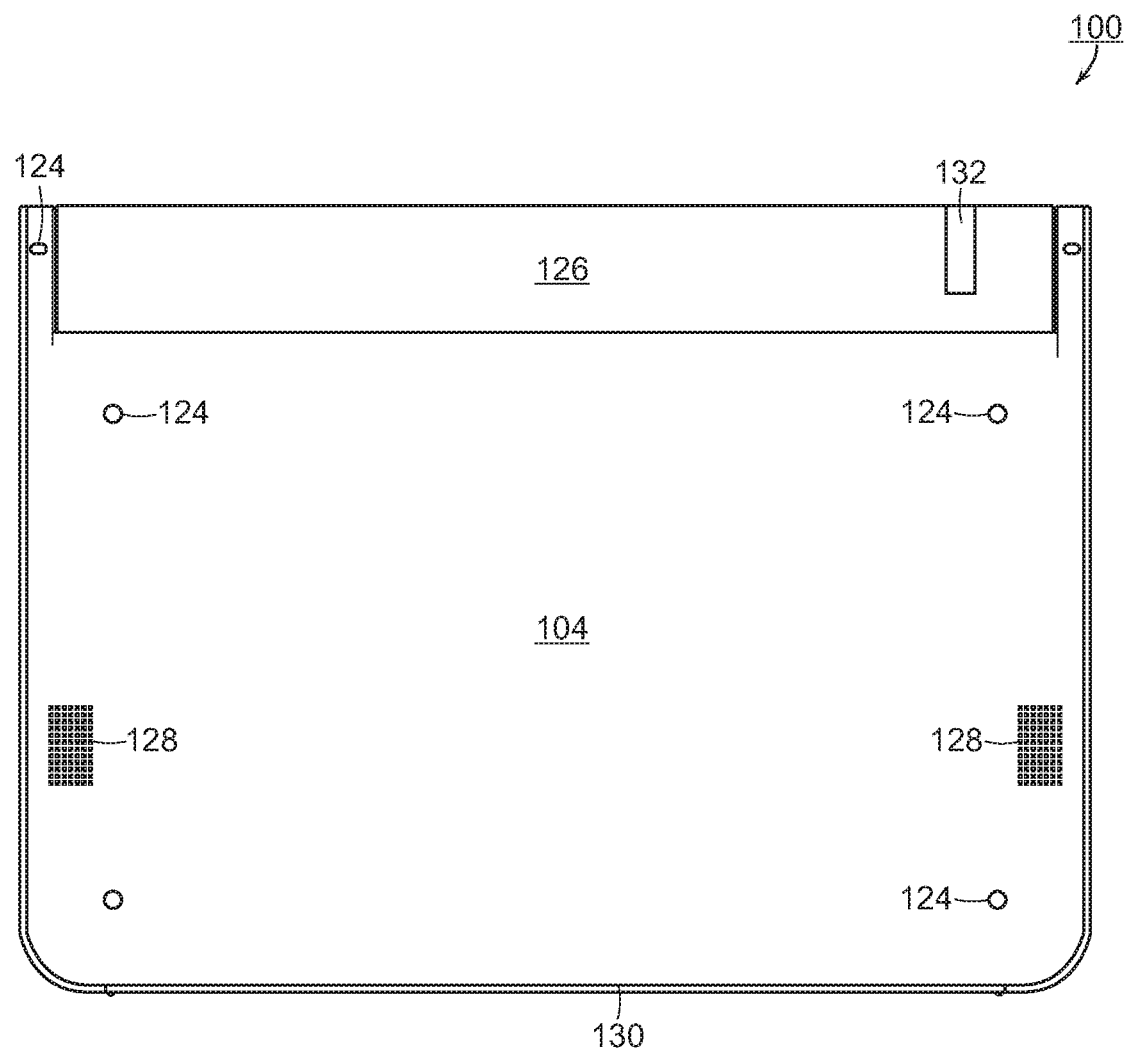
FIG. 3 is a plan view of the exterior of the bottom of the portable computer of FIG. 1.

An exterior view of the bottom of the base 104 (the underside of the portable computer 100) is illustrated in FIG. 3. As can be seen in FIG. 3, in one embodiment, the base 104 includes a plurality of feet 124. In one example, the feet 124 are made of rubber; however, it is to be appreciated that the invention is not so limited and the feet may be made of another material, such as, for example, a polymer or felt. A ventilation slit 126 may be provided near an interface between the base 104 and the display component 102, as illustrated, or elsewhere as may be desired, to allow heat to dissipate from the internal electronic components in the base. The base 104 may also include one or more speakers 128. In one example, the base 104 includes two stereo speakers 128, positioned at either side of the base, as illustrated in FIG. 3; however, it is to be appreciated that the portable computer 100 may comprise more or fewer speakers which may be placed at any location on the base 104. A scroll wheel 132 may be provided to allow a user to control certain functionality of the portable computer 100, such as navigating web pages, controlling speaker volume, selecting programs, etc., as discussed further below.

According to one embodiment, the base 104 may comprise a cushioning strip 130 disposed along an edge of the base 104 opposite to the interface between the display component 102 and the base, as illustrated in FIG. 3. The cushioning strip 130, which may comprise rubber, a polymer, or another suitable material, may serve as a "foot" when the portable computer is configured into the easel mode, as discussed further below. In one embodiment, the display component 102 may be provided with a similar cushioning strip that may serve as a second supporting foot when the portable computer is configured into the easel mode.

Figure 4:
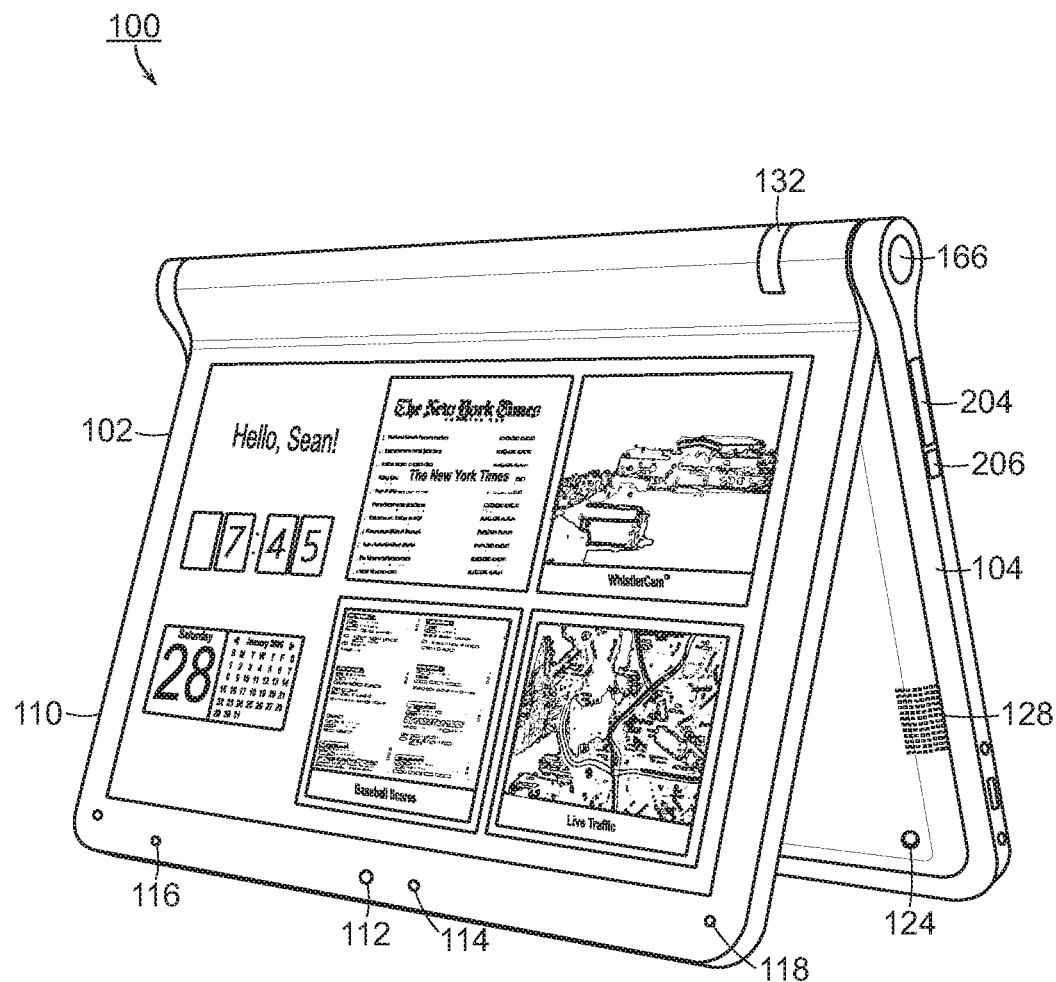
FIG. 4 is a perspective view of the portable computer of FIG. 1 in the easel mode.

Referring to FIG. 4, there is illustrated an example of the portable computer 100 configured into the easel mode. To convert the portable computer 100 from the laptop mode (or closed position) into the easel mode, the display component 102 may be folded away from the base 104, in the same direction as to open the computer (i.e., to configure the computer from the closed position into the laptop mode) such that the base 104 and the display component 102 form an inverted "V" shape with the bottom of the base and the back of the display component face another, as illustrated in FIG. 4. In the easel mode, the display screen 110 is visible and accessible on one side of the portable computer 100 and the keyboard 106 (not shown in FIG. 4) is visible and accessible on the other side.

As illustrated in FIG. 4, in one embodiment, the portable computer may comprise integrated hardware volume controls, including a volume control button 204 and a mute button 206. In one example, the volume control button 204 may be a rocker switch that allows a user to easily increase or decrease the volume of audio played through the speakers 128. When the user presses the volume control button 204, a volume indicator may temporarily appear on the display screen 110, to provide a visual indication of the amount by which the volume is being increased or decreased. Similarly, pressing the mute button 206 may cause a visual indication that the volume is muted to appear on the display screen 110.

According to one embodiment, when the portable computer 100 is configured into the easel mode, the visual display on the display screen 110 is automatically rotated 180 degrees such that the information appears "right-way-up," even through the display screen is upside-down compared to when the portable computer is in the laptop mode. Thus, a user may simply "flip" the portable computer 100 into the easel mode and immediately be able to comfortably view information on the display screen 110, without having to access display screen controls to adjust the orientation of the visual display. In one embodiment, the portable computer 100 includes an orientation (or mode) sensor that is configured to detect whether the portable computer is in the laptop mode or the easel mode, and to adjust the display accordingly. The orientation sensor may be incorporated into the base component 104, for example, underneath the keyboard 106, or into the display component. In one example, locating the orientation sensor in the display component 102, rather than the base 104, may provide more robust detection and therefore, may be presently preferred in some embodiments. The orientation sensor may be used to determine a precise relative orientation of the base component 104 with respect to the display component 102, or vice versa, for example, to determine whether the device is in the laptop mode, easel mode, or some point in between the two modes. In one example, the orientation sensor includes an accelerometer whose output is fed to the computer operating system (or to dedicated logic circuitry) which then triggers a display inversion as appropriate.

Accelerometers have been used in portable devices such as cellular phones, media players or computers, as sudden motion sensors, or "drop detectors," to protect against hard drive crashes in the event that the device is dropped. By contrast, however, the accelerometer in the portable computer according to an embodiment of the invention is not used to detect motion of the overall computer, but rather to detect a configuration of the portable computer 100 (e.g., laptop mode or easel mode), particularly, to detect an orientation of the display component 102 relative to the base component 104. In one example, information from the accelerometer is provided to a display controller in the portable computer and used to switch the display between portrait or landscape mode, as is done in some conventional devices.

Figure 5:
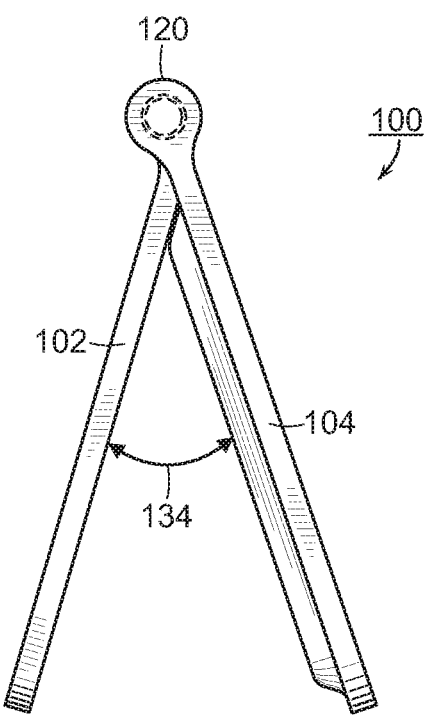
FIG. 5 is a side view of the portable computer of FIG. 4, illustrating the adjustable angle of the easel mode.
Figure 6A:
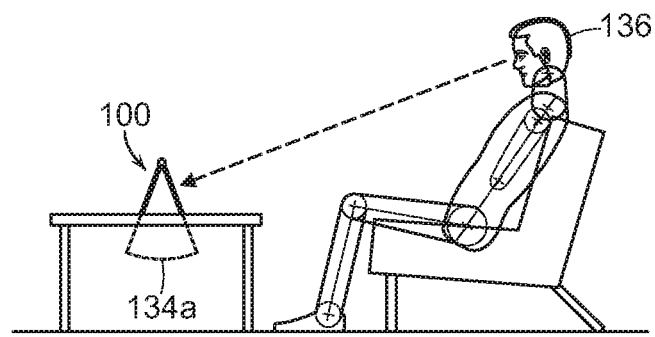
FIGS. 6A-C are diagrams illustrating different positions of the portable computer of FIG. 4 in easel mode.
Figure 6B:
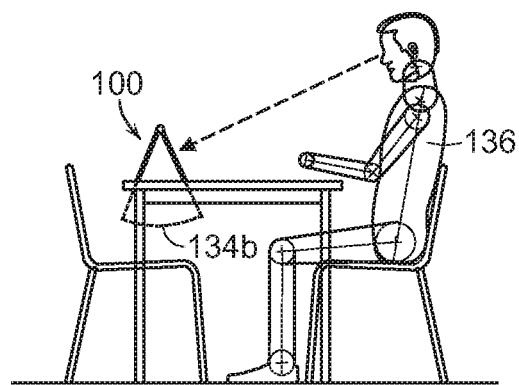
Figure 6C:
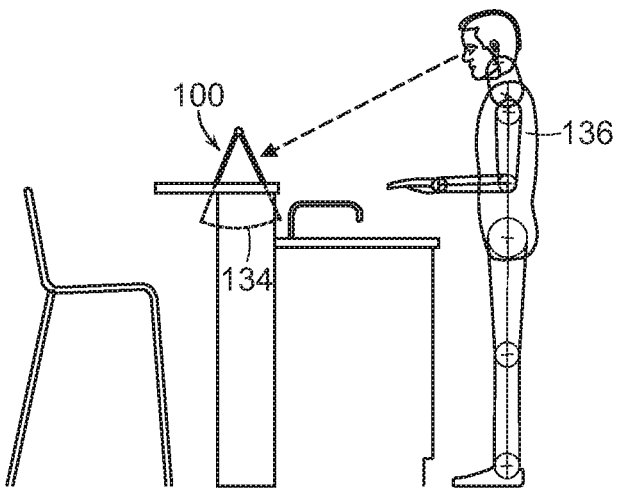

Referring to FIG. 5, when the portable computer 100 is in the easel mode, the base 104 is disposed at an angle 134 to the display component 102. This angle 134 is adjustable, for example, to allow a comfortable viewing angle to the display screen 110 to be maintained for different positions of a user 136 and of the portable computer 100, as illustrated in FIGS. 6A, 6B and 6C. For example, when the user 136 is further from the portable computer, the angle 134a (FIG. 6A) may be made smaller than the angle 134b when the user is closer to the portable computer (FIG. 6B). As discussed above, in one example, the orientation sensor (not shown) may be used to detect, either approximately or precisely, the angle 134 and to provide the information to the computer operating system.

According to one embodiment, the display component 102 is pivotably coupled to the base 104 by a hinge that allows the display component to be moved relative to the base so as to allow the portable computer 100 to be configured into the closed position, the laptop mode or the easel mode. As discussed above, in conventional "clamshell" type portable computers, the hinges that couple the display component to the base generally do not permit more than about 180 degrees of rotation of the display component. Thus, these conventional portable computers can be in a closed position or open, laptop configuration, but cannot be configured into an easel mode because the conventional hinges do not permit sufficient movement of the display component. Similarly, the tablet-type portable computers discussed above have displays that can be opened, rotated and folded such that they lie flat against the keyboard on the base, but cannot be configured into an easel mode. Although, as discussed above, U.S. Pat. No. 6,266,236 discloses a computer that is configurable into a presentation mode, this requires a complex arm assembly. By contrast, the portable computer according to embodiments of the present invention may be configured into the easel mode by simply continuing to tilt or rotate the display component past the "laptop positions" until a desired easel angle 134 is reached.

Figure 7A:
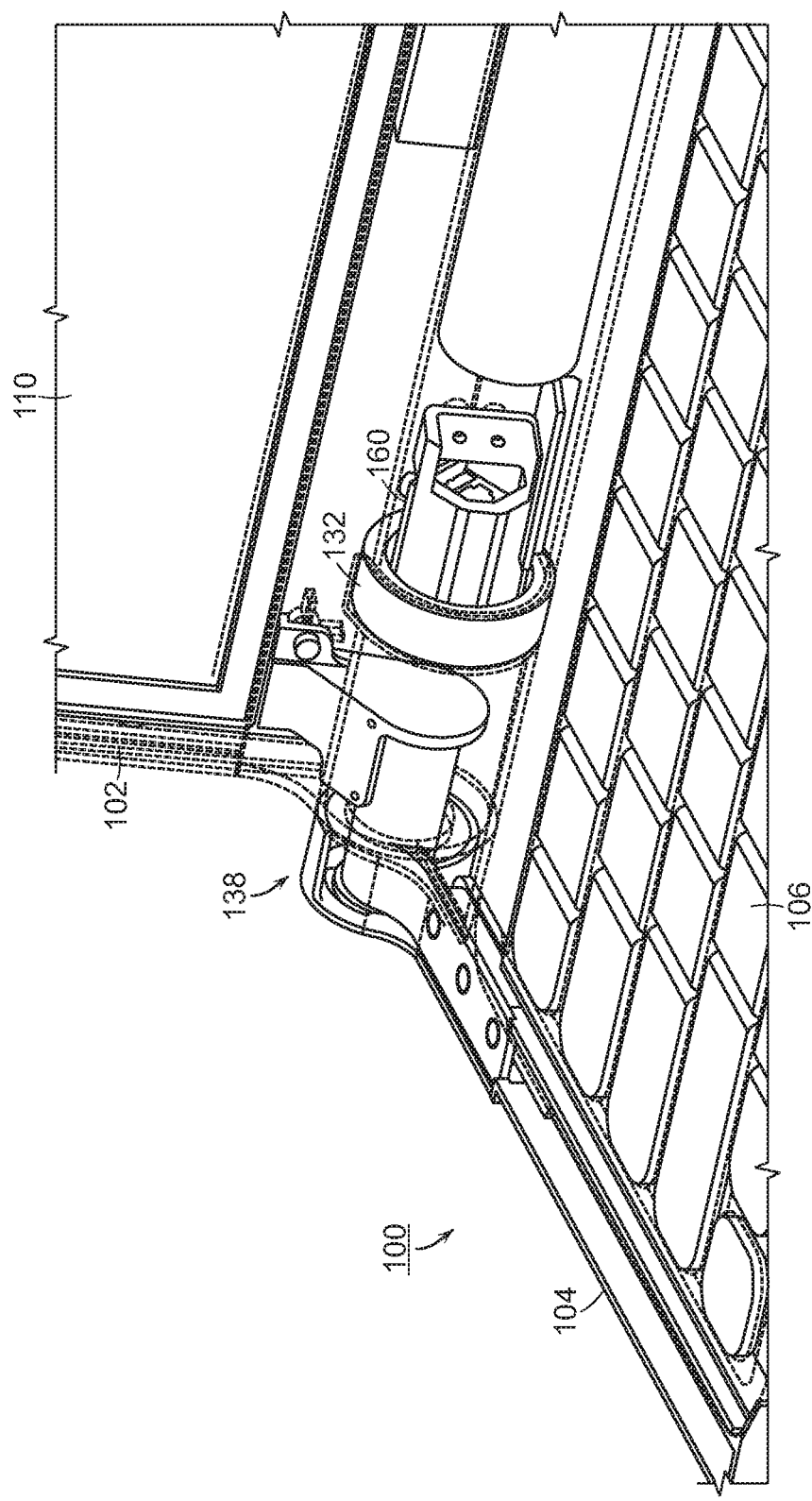
FIG. 7A is an illustration of a portion of the portable computer of FIG. 1 in the laptop mode, illustrating a hinge assembly according to aspects of the invention.
Figure 7B:
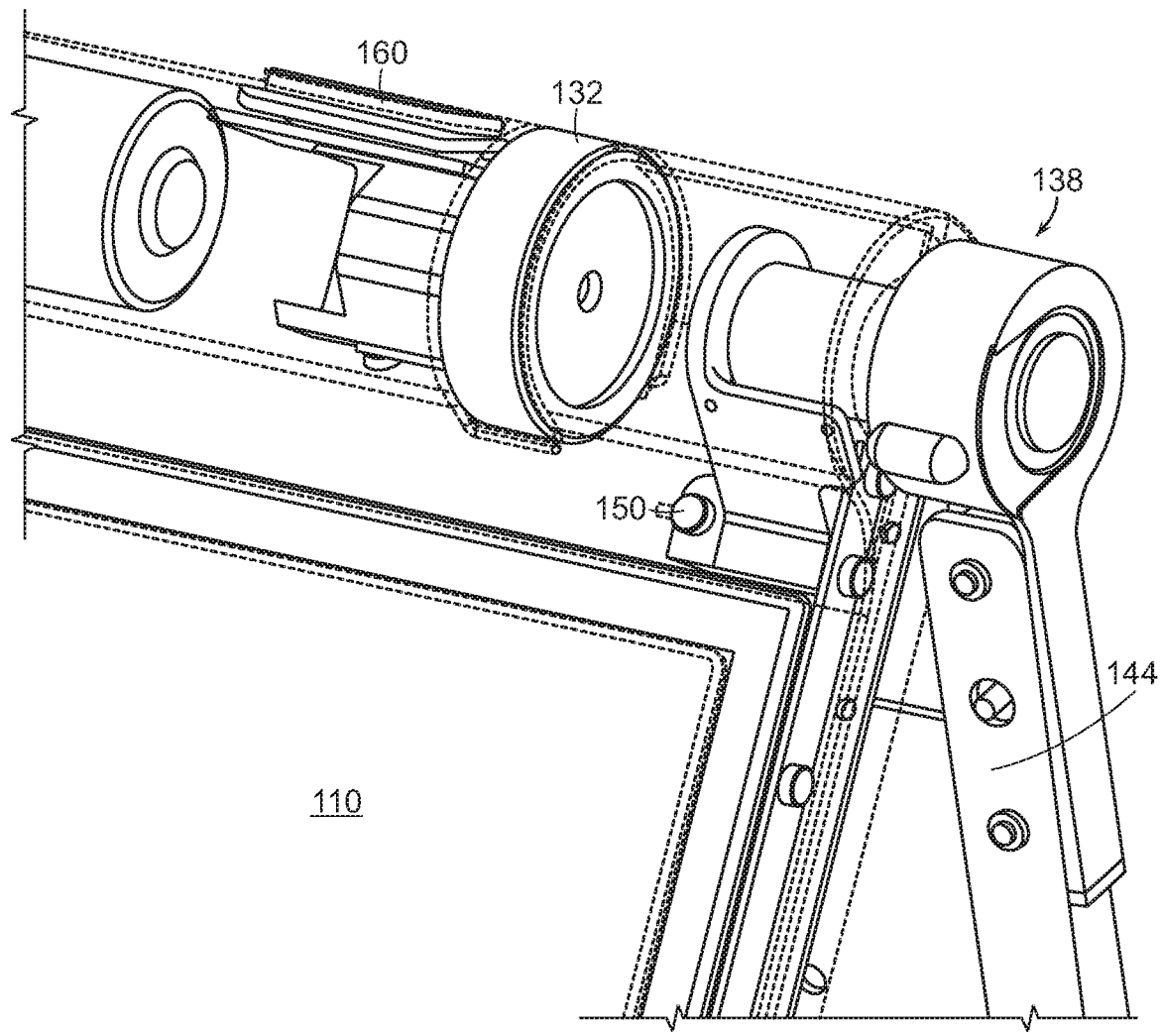
FIG. 7B is an in illustration of a portion of the portable computer of FIG. 1 in the easel mode, illustrating the hinge assembly according to aspects of the invention.

Referring to FIGS. 7A and 7B, there is illustrated a portion of the portable computer 100 illustrating a hinge assembly 138 that allows the portable computer to be configured into either the laptop mode (FIG. 7A) or the easel mode (FIG. 7B), according to aspects of the invention. According to one embodiment, the hinge assembly 138 accommodates 0-320 degrees of rotation, allowing a minimum angle 134 (see FIG. 5) of 40 degrees. However, it is to be appreciated that the hinge assembly 138 may allow greater or fewer degrees of rotation, provided only that sufficient rotation is allowed so as to configure the portable computer 100 into either the laptop mode or the easel mode. As discussed above, in one embodiment the portable computer 100 includes an orientation sensor (not shown) that is configured to detect a relative orientation of the display component 102 and the base component 104. In one example, the orientation sensor may be an accelerometer incorporated into the base component 104, as discussed above. Alternatively, the orientation sensor may be incorporated into the hinge assembly 138 and may be used to detect movement of the hinge assembly, and to translate that movement into an information about the relative orientation of the display component 102 and the base component 104 (for example, a size of the angle 134). It is also to be appreciated that the orientation sensor may include electronic or mechanical components, or a combination thereof. For example, the hinge assembly may be provide with detents that provide an indication of the mode of the portable computer.

As discussed above, and also illustrated in FIGS. 7A and 7B, the portable computer may also comprise a scroll wheel 132 that allows a user to adjust, control and/or select various aspects of the portable computer (e.g., wireless capability or speaker volume) or items displayed on the display screen 110. A housing 160 may contain or support various mechanical and/or electronic components (not shown) that are coupled to the scroll wheel 132 and are configured to convert physical movement of the scroll wheel into electrical signals. These electrical signals may be provided to the central processing unit of the portable computer 100 which processes the electrical signals so as to translate movement of the scroll wheel into control of a selected feature, for example, adjusting the volume of the speaker(s) or selecting a particular item displayed on the display screen, as discussed further below.

Figure 8:
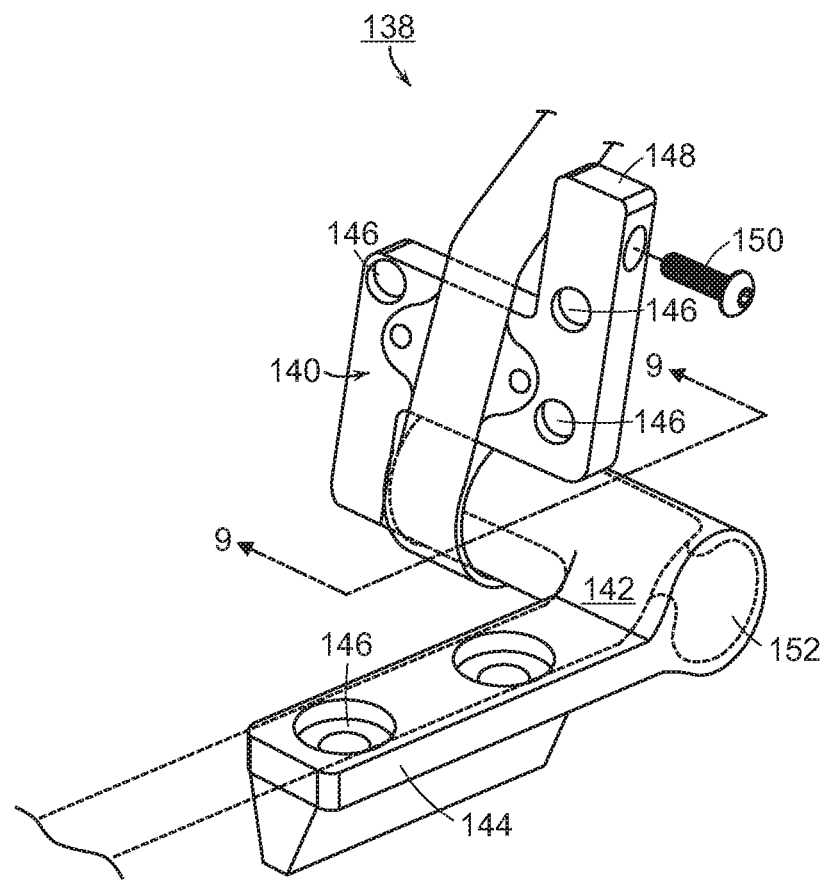
FIG. 8 is a diagram of one example of the hinge assembly of FIGS. 7A and 7B.
Figure 25:
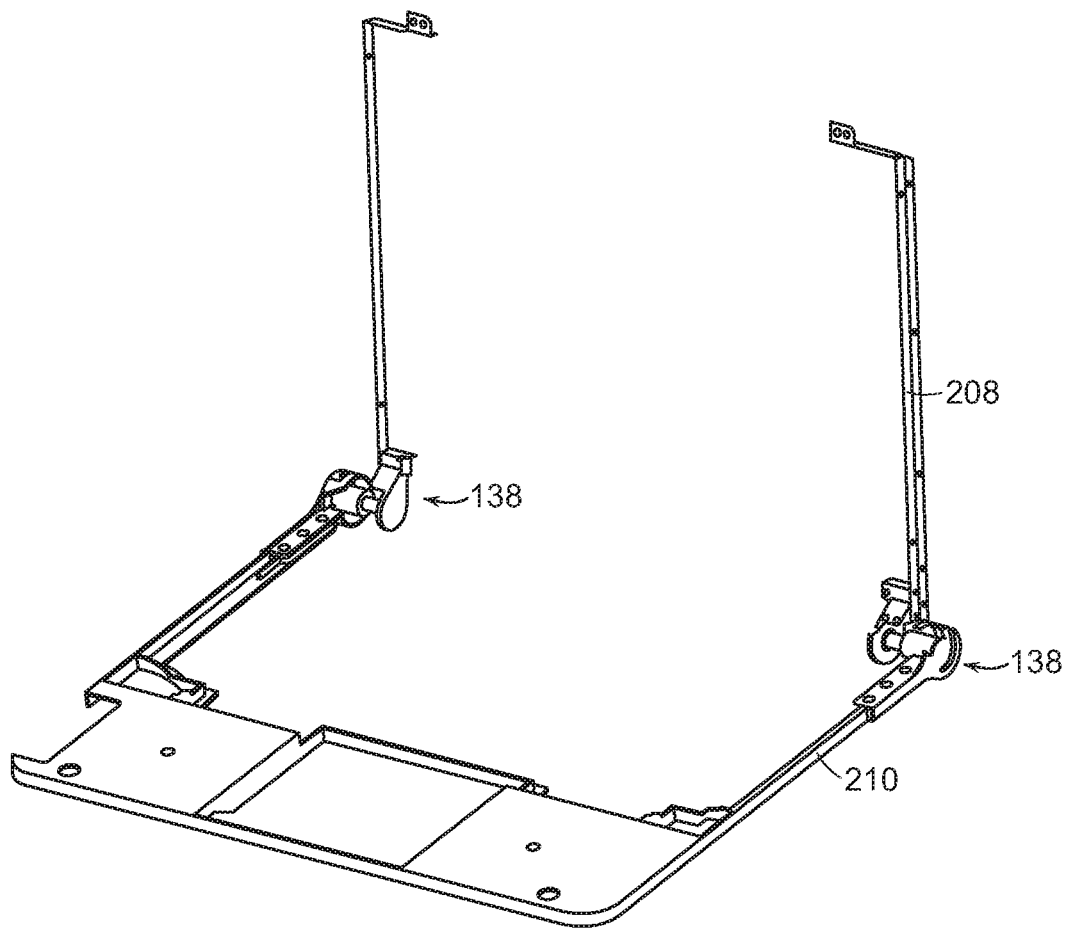
FIG. 25 is an illustration of a hinge assembly coupled to a computer frame, according to aspects of the invention.

One embodiment of the hinge assembly 138 is illustrated in FIG. 8. The hinge assembly includes a bracket 140 rotatably coupled to a housing 142. The housing 142 may include a first flange 144 that may be fastened to an internal frame in the base 104, as illustrated in FIG. 7A. The first flange 144 may include holes 146 to allow the first flange to be fastened to the base 104 using fasteners, such as, for example, screws, rivets or bolts. The bracket 140 may include a second flange 148 that may be similarly coupled to the display component 102 using fasteners 150. In one embodiment, the display screen 110 (see FIG. 1) may be an LCD screen. As known to those skilled in the art, an LCD screen generally comprises a frame and plastic housing. In one example, the second flange 148 may be fastened to either or both of the display screen frame and the screen's plastic housing. Referring to FIG. 25, there is illustrated an example of two hinge assemblies 138 coupled to the display frame 208 of the display component, and to the base frame 210 of the base component 104. According to one embodiment, the bracket 140 and/or housing 142 may be formed of cast zinc. However, it is to be appreciated that other materials, including other metals, may be used, and the bracket 140 and/or housing 142 may be formed using a procedure other than casting, such as, for example, machining or molding.

Referring again to FIG. 8, in one embodiment, the hinge assembly 138 may also incorporate an area 152 for locating the power button (FIG. 2, 122) or a navigation control button (FIG. 4, 166), as discussed further below.

Figure 9:
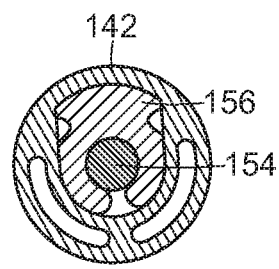
FIG. 9 is a cross-sectional diagram of a portion of the hinge assembly of FIG. 8, taken along line 9-9 in FIG. 8.

Referring to FIG. 9, there is illustrated a cross-sectional view of a portion of the hinge assembly 138 taken along line A-A in FIG. 8. As shown in FIG. 9, in one embodiment the hinge assembly 138 comprises a shaft 154 located within the hinge housing 142. The shaft 154 may be held in position within the hinge housing 142, and rotatably coupled to the housing, by torsion elements, such as springs 156. In one example, the springs 156 may be formed by stamping; however, it is to be appreciated that other methods of manufacture may be used. In one example, the hinge assembly may accommodate about 320 degrees of rotation, as discussed above, and may provide about 6.5 in-lbs in symmetric torque.

Figure 10:
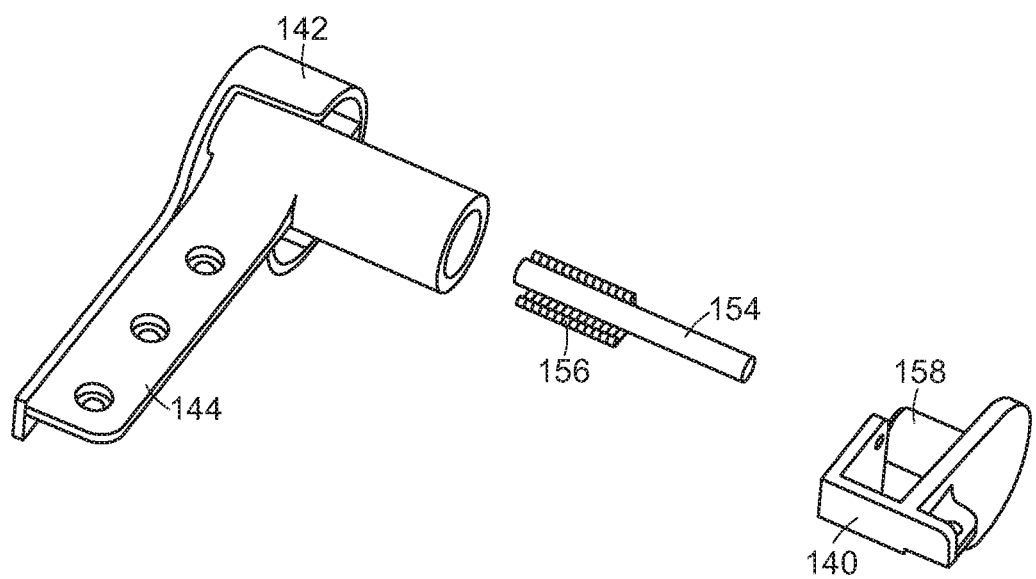
FIG. 10 is an exploded view of the hinge assembly of FIG. 8.

FIG. 10 is an exploded view of the hinge assembly of FIGS. 8 and 9. As shown in FIG. 10, the shaft 154 is coupled to a member 158. This member 158 may be integral with or coupled to the bracket 140 which is, in turn, fastened to the display component, as discussed above. Thus, the shaft 154 and springs 156 provide a rotatable coupling between the fixed elements of the hinge assembly, namely, the hinge housing 142 and bracket 140 which are fastened to the base 104 and display component 102 of the portable computer. In this manner, the hinge assembly allows the display component 102 to be moved relative to the base 104, thereby allowing the portable computer to be easily and quickly configured into any of the closed position, laptop mode or easel mode. For example, simply rotating or tilting the display component about the longitudinal axis 101 (see FIG. 1) up to approximately 180 degrees from the closed mode configures the portable computer into the laptop mode, and rotating the display component about the longitudinal axis 101 beyond approximately 180 degrees axis from the closed mode configures the portable computer into the easel mode.

According to one embodiment, the portable computer may include integrated "navigation" hardware that allows a user to easily and comfortable control various features and functions of the portable computer, and to manipulate content displayed on the portable computer. For example, as discussed above, the portable computer 100 may comprise a scroll wheel 132 that allows a user to control, adjust and/or select various functionality of the portable computer. According to another embodiment, the scroll wheel 132 may be used to provide "hardware navigation" through information, such as menus, icons, etc., displayed on the display screen 110, as discussed further below with reference to FIG. 17. A common display configuration used in conventional computers is a "desktop" view in which multiple icons representing links to various programs or applications are displayed over a background image. Navigation is conventionally performed using a mouse, touch pad or trackball, as known to those skilled in the art. In one embodiment, the portable computer 100 may display information on the display screen 110 in the conventional desktop configuration, and navigation may be performed using either conventional tools, such as a touchpad 108, trackball (not shown) or peripheral, for example, a mouse, that is connected to the portable computer 100 via a port 164, or the scroll wheel 132, or a combination thereof. According to another embodiment, the portable computer 100 includes a streamlined graphical user interface that supports "map" navigation. The map user interface provides a clear overview of the entire computing environment and searching capability within the environment that may be accessed using the scroll wheel 132 and, optionally, one or navigation buttons 166, 168 that may be provided on the base 104 of the portable computer 100 (button 166) and/or in the keyboard 106 (button 168), illustrated in FIG. 17. In one embodiment, the map mode of navigation is a hierarchical mode that reduces the number of items to select amongst at any stage of navigation, thereby facilitating user access with the scroll wheel 132 and, optionally, the navigation button(s) 166, 168. Of course, it is to be appreciated that the map user interface may also be navigated using conventional tools, such as a trackball, touchpad, mouse or arrow keys.

Figure 11:
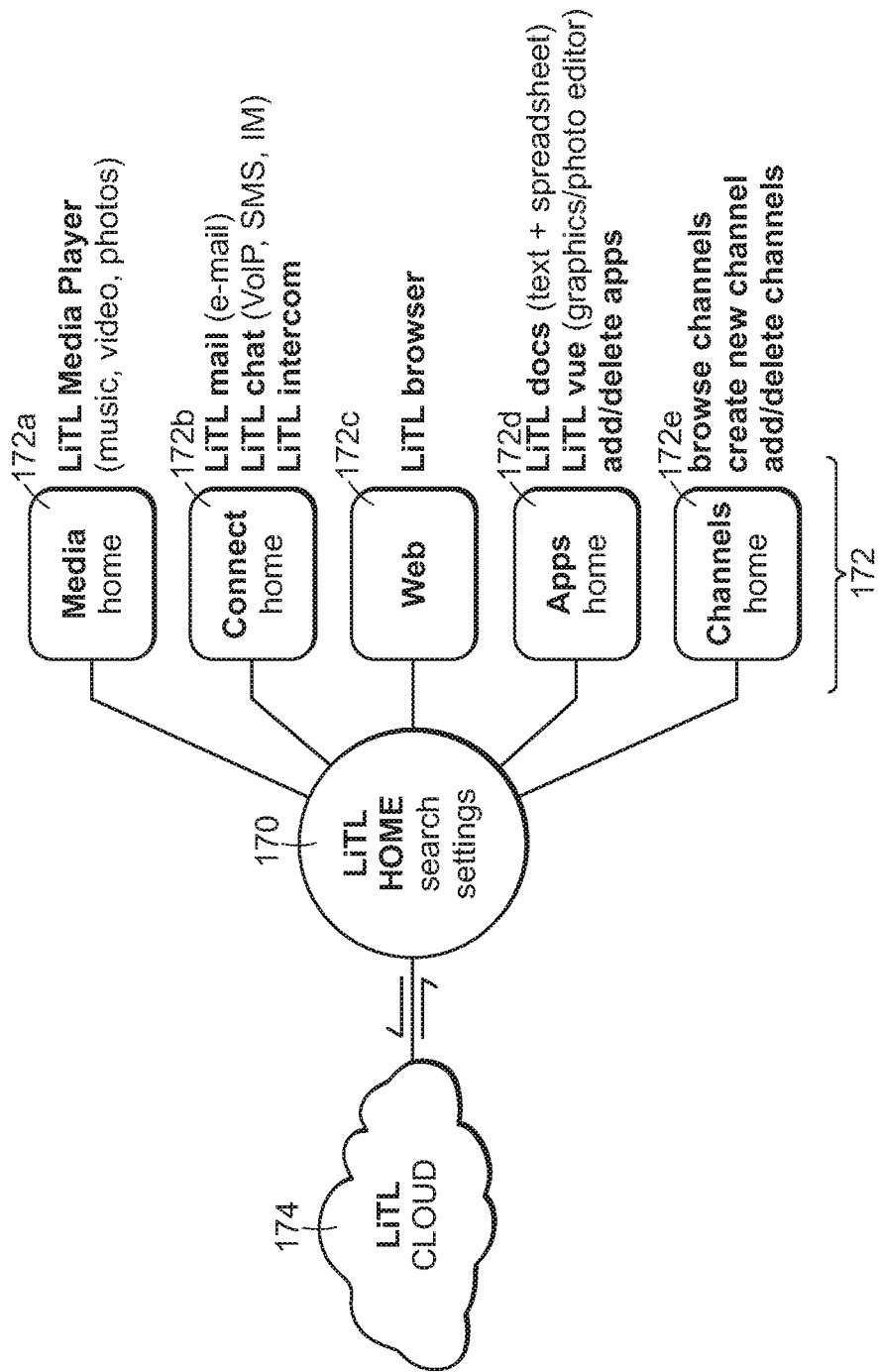
FIG. 11 is a block diagram of one example of a portable computer user interface architecture, according to aspects of the invention.

Referring to FIG. 11, there is illustrated a block diagram of one example of an architecture of the portable computer including a map user interface. The user interface "home" screen 170 that displays a plurality of modes of content 172. In the illustrated example, the home screen 170 contains five modes of content 172; however, it is to be appreciated that the home screen may include more or fewer than five modes of content and that the modes of content may differ from the examples discussed below. According to one example, the modes of content 172 accessible via the home screen 170 may include "media" 172a, "connect" 172b, "web" 172c, "applications" 172d, and "channels" 172e. Using the map user interface, information, programs, features and applications may be grouped into the various modes of content 172. By selecting any mode of content 172, for example, by using the scroll wheel 132 and/or navigation buttons 166, 168, as discussed further below, the user may access the content organized within that mode. For example, the media mode 172a may provide access to a medial player to play, view, search and organize media such as music, video, photos, etc. The connect mode 172b may provide access to features such as, for example, email, voice-over-IP, instant messaging, etc., and the web mode 172c may provide access to internet browsing and searching. The application mode 172d may provide access to, for example, computer applications or programs, such as word processor, spreadsheet, calculator, etc. In one example, these applications or programs may be provided as web-based services rather than programs or applications residing on the portable computer 100. The channels mode 172e may provide access to different functionality of the portable computer, with the different functions or features defined as different channels. For example, a channel may include an alarm clock channel in which the portable computer is configured to display a clock and can be programmed to activate an alarm, e.g., a sound, piece of music, etc., at a predetermined time. Another example of a channel may include a "photo frame" channel in which the portable computer may be configured to display a pre-selected image or set of images, etc. Another example of a channel is a "television" channel, in which the portable computer is configured to stream Internet television. In one example, a user may configure particular Internet television channels (e.g., a news channel, a movie channel, a home and garden channel, etc.) into sub-channels within the channels mode of content 172(e). Some or all of the modes of content 172 may access, retrieve and/or store information on the Internet 174.

Figure 12:
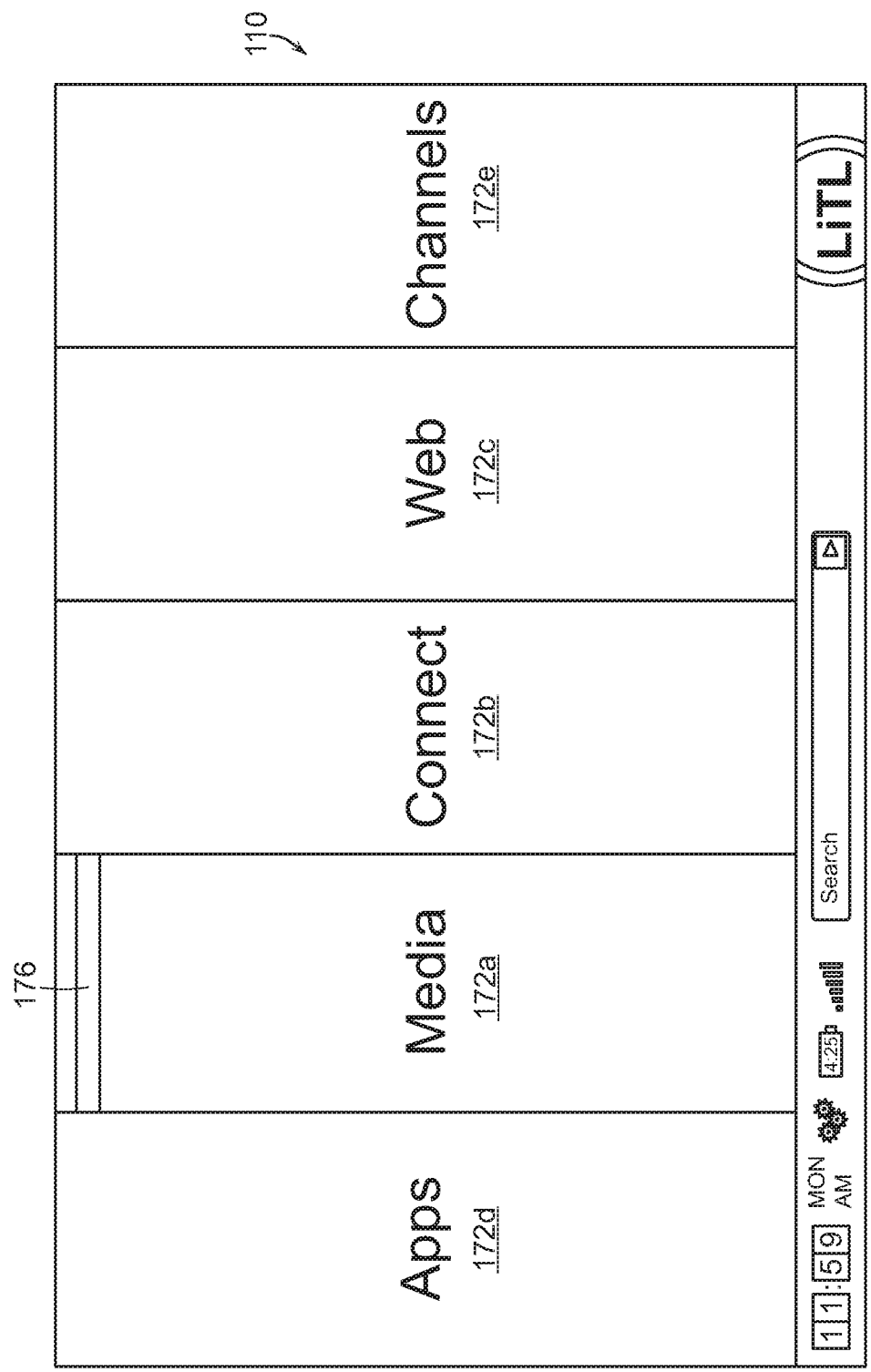
FIG. 12 is a screen shot illustrating one example of a graphical user interface, according to aspects of the invention.
Figure 13:
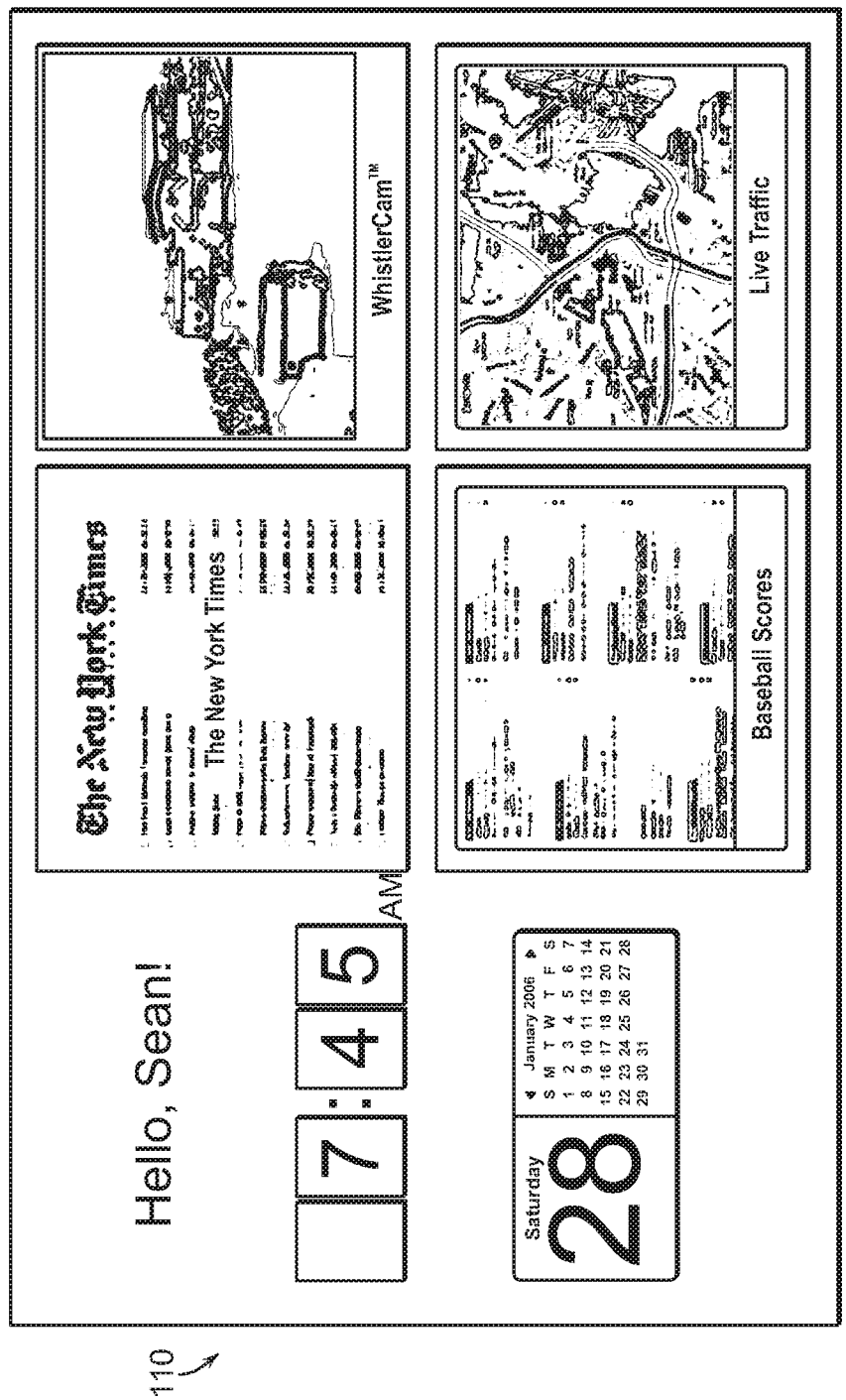
FIG. 13 is a screen shot illustrating another example of a graphical user interface according to aspects of the invention.

According to one embodiment, the different modes of content 172 may be displayed as a series of bars across the display screen 110, as illustrated in FIG. 12. The following discussion of various features, including hardware navigation through the map user interface may refer primarily to the display configuration illustrated in FIG. 12. However, it is to be appreciated that the invention is not so limited, and the modes of content may be displayed in other configurations, including, for example, a "desktop" and icon configuration, a "dashboard" type display, as illustrated in FIG. 13, or another configuration, as would be recognized by those skilled in the art. Similarly, navigation is discussed below primarily with reference to the scroll wheel 132 and navigation buttons 166, 168; however, it is to be appreciation that navigation may also be accomplished using any of the conventional tools discussed above or known to those skilled in the art.

As discussed above, according to one embodiment, the scroll wheel 132 and, optionally, the navigation buttons 166, 168 may be used to navigate the user interface. Referring again to FIG. 12, scrolling the scroll wheel may sequentially highlight different ones of the modes of content 172. In one example, the highlighting may be achieved by changing the color of the selected mode, and/or by providing a visual indicator, such as a colored bar 176. A highlighted mode 172 may be selected by pressing the scroll wheel, thereby bringing up a new "page" or screen on the user interface corresponding to the selected mode. Once within a selected mode of content 172, the scroll wheel may similarly be used to select particular functions, features or applications within that mode. In one embodiment, the default action for the scroll wheel 132 may vary depending on whether the portable computer 100 is in the laptop mode or the easel mode. For example, in easel mode, the default action for the scroll wheel may be channel selection within the channels mode 172(e).

Figure 14:
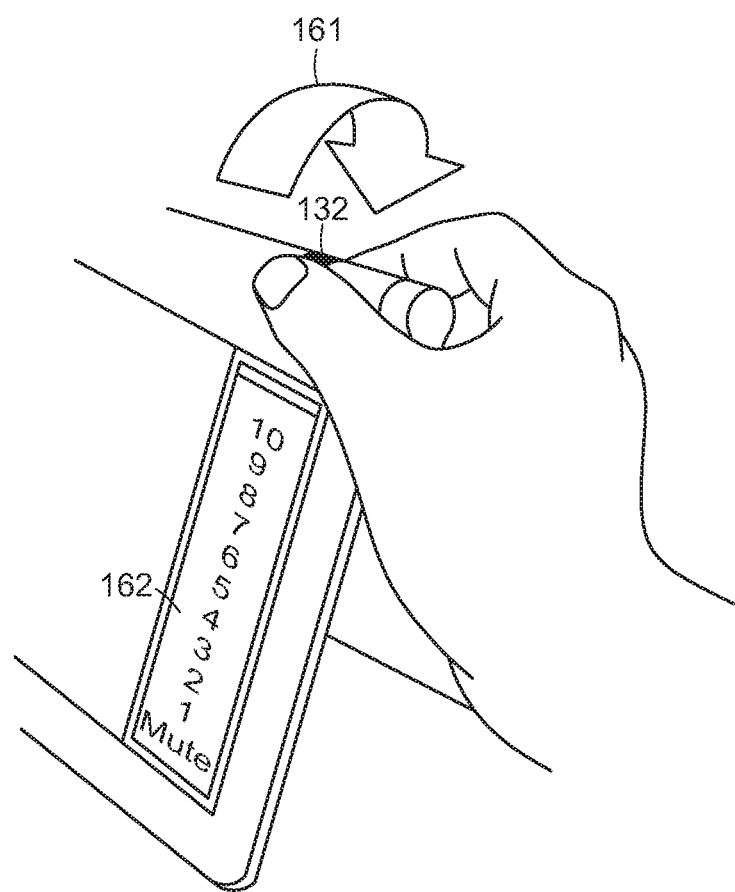
FIG. 14 is an illustration of a user adjusting the scroll wheel on a portable computer in the easel mode, according to aspects of the invention.

As discussed above, in one embodiment volume control for the speakers 128 may be provided by the volume control button 204 and mute button 206. Alternatively, according to another embodiment, volume control may be provided using the scroll wheel 132. Thus, as a user scrolls the scroll wheel 132, as illustrated in FIG. 14 by arrow 161, a volume indicator may appear on the display screen 110. In one example, the volume indicator may comprise a transparent, or partially transparent, box 162 containing volume level indicators that may appear directly below the scroll wheel 132 on the display screen 110. In this example, as the user scrolls the scroll wheel 132, different volume levels in the volume box 162 may be successively highlighted, to indicate to the user that the volume is increasing or decreasing.

Figure 15:
FIG. 15 is an illustration of a user pressing the scroll wheel on a portable computer, according to aspects of the invention.

In one embodiment, the scroll wheel 132 may be depressible as well as scrollable. Thus, pressing the scroll wheel 132, as illustrated in FIG. 15, may allow further control, such as, for example, selecting a channel onto which the user has scrolled, or "play" and "pause" of audio or video being played through the portable computer 100.

Figure 16:
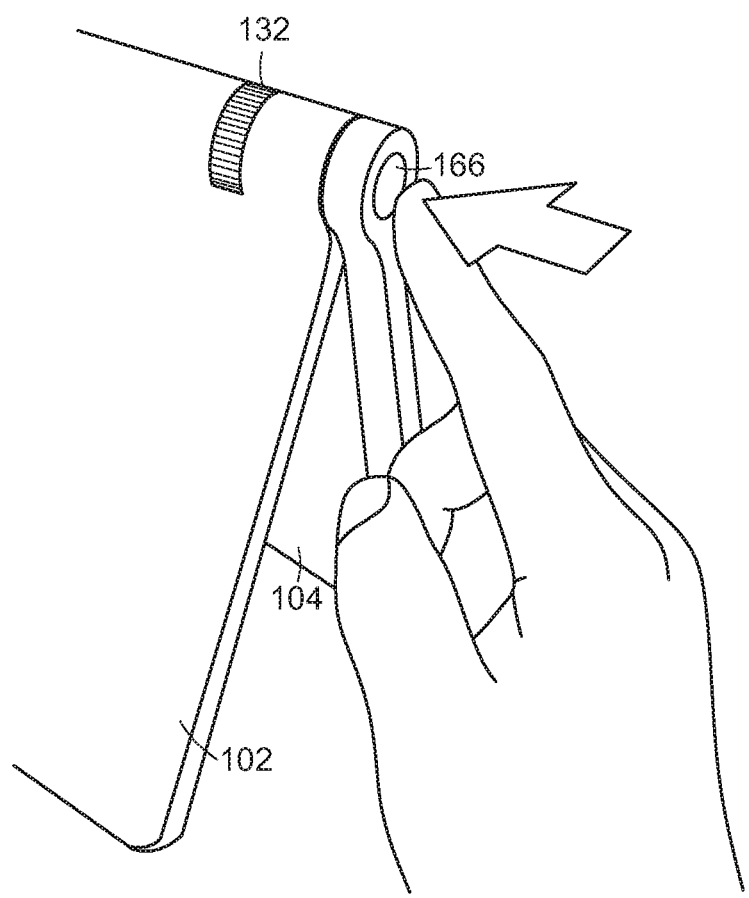
FIG. 16 is an illustration of a user pressing a navigation button on the portable computer, according to aspects of the invention.

As discussed above, according to one embodiment, one or more navigation buttons may be used in conjunction with the scroll wheel. In particular, in one embodiment, the navigation button(s) may be used to change the action of the scroll wheel. As discussed above, in one example, the default action of the scroll wheel is volume control. This action may be changed by pressing the navigation button 166, as illustrated in FIG. 16, for example, from volume control to menu navigation in the user interface, and vice versa. According to one embodiment, the effect of pressing the navigation button 166 may vary depending on active the mode of content of the portable computer 100. For example, if a user is in the media mode using a photo viewing application, pressing the navigation button 166 may change the action of the scroll wheel 132 from mode navigation to slideshow controls for the photos. When the navigation button 166 is pressed, an control indicator box (similar to the volume indicator box 162 discussed above with reference to FIG. 14) may appear containing different actions for the photo slideshow, such as "play," "next," "back," "skip," "full screen view," etc., and scrolling the scroll wheel 132 may allow a user to select one of these actions. Pressing the navigation button 166 again may return the scroll wheel action to menu navigation, to allow the user to, for example, move to a different feature or application within the active mode, or to select a different mode.

Figure 17:
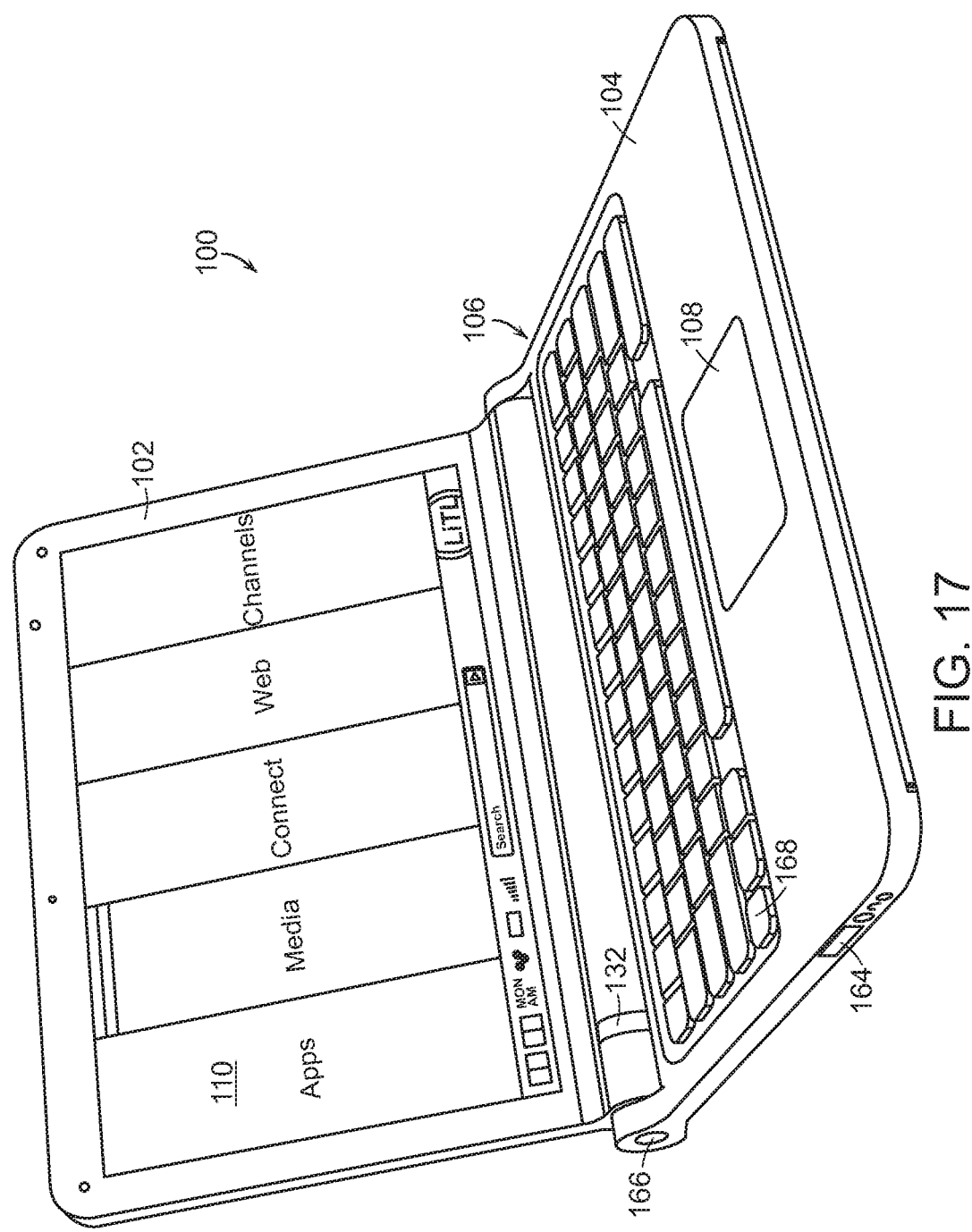
FIG. 17 is an illustration of an example of the portable computer in the laptop mode, according to aspects of the invention.

As can be seen in FIG. 16, the navigation button 166 may be easily accessed when the portable computer 100 is in the easel mode, providing a convenient navigation tool for this configuration. A similar navigation button 168 may be provided on the keyboard 106, as illustrated in FIG. 17. In one example, the functionality of the two navigation buttons 166, 168 may be the same, with the different locations providing easy, comfortable access in the different configuration modes (i.e., laptop or easel) of the portable computer 100. Thus, a user may use either navigation button 166 or navigation button 168, depending on personal preference. In another example, the two navigation buttons may have different functionality. For example, the navigation button 166 may be used to alter the action of the scroll wheel 132, as discussed above, while the navigation button 168 is used to navigate "up" or "down" a level within the map user interface. For example, pressing the navigation button 168 while within a given mode of content may allow the user to "back up" to the home screen; or pressing the navigation button 168 while within a selected channel (in the channel mode of the content 172e) may allow the user to "back-up" to the channel mode main page.

It is to be appreciated that numerous variations on the functionality of the navigation buttons 166, 168 is possible, as would be recognized by those skilled in the art, and the above examples are given for illustration only and are not intended to be limiting. In addition, any functions described with reference to one navigation button (166 or 168) may be instead (or additionally) implemented with the other navigation button. In one example, the function of the navigation buttons 166, 168 may vary depending on whether the portable computer 100 is configured into the laptop mode or the easel mode. For example, only the navigation button 166 may be active in the easel mode, and only the navigation button 168 may be active in the laptop mode. Alternatively, both navigation buttons 166, 168 may be usable in either the laptop mode or the easel mode, but their functionality may vary. For example, when the portable computer 100 is in the easel mode, the default action for the navigation button 166 may be channel selection whereas the default action for the navigation button 168 is to access the "home" screen. Furthermore, the portable computer 100 is not limited to the use of two navigation buttons and may instead comprise only a single navigation button or more than two navigation buttons, any of which may be disposed in the locations described above (e.g., on the rounded portion 120 of the base 104 or on the keyboard 106), or in other locations on the portable computer.

As discussed above, according to one embodiment, the function or display content and/or display orientation of the portable computer may vary when the portable computer is configured from the laptop mode into the easel mode, or vice versa. For example, as discussed above, when the portable computer 100 is configured into the easel mode, the visual display on the display screen 110 is automatically rotated 180 degrees such that the information appears "right-way-up," even through the display screen is upside-down compared to when the portable computer is in the laptop mode. In another example, for at least some activities within at least some modes of content (e.g., viewing a photograph or video), when the portable computer 100 is configured into the easel mode, the display may automatically adjust to "full screen view" (i.e., the displayed image or video is displayed on the full screen size, rather than in a window) to allow for comfortable viewing.

In addition, as discussed above, the ability to configure the portable computer 100 into either the laptop mode or the easel mode provides enhanced functionality. For example, when the portable computer 100 is not being actively used, the user may configure the portable computer into the easel mode, and program the portable computer to act as a digital photo frame, displaying one or more photos of the user's choice. In the easel mode, the portable computer 100 may occupy a smaller footprint on a surface than in the laptop or closed modes because the base 104 and display component 102 are upright, as illustrated in FIGS. 4 and 5. In addition, because the portable computer can act as a passive information and/or entertainment device, such as a photo frame or clock, as discussed above, the portable computer may provide a useful function even when not being actively used by the user, and may do so (in the easel mode) without taking up much surface area.

Figure 18:
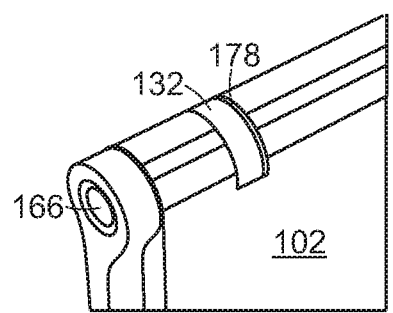
FIG. 18 is a view of a portion of the portable computer illustrating a wireless signal indicator feature, according to aspects of the invention.

According to another embodiment, the portable computer 100 may further comprise a wireless signal indicator 178, as illustrated in FIG. 18. The wireless signal indicator 178 may indicate the availability and/or strength of a wireless signal to which the portable computer 100 is connected, or is attempting to connect to. In one example, the color of the wireless signal indicator 178 may provide information regarding the strength of a detected wireless signal. For example, green may indicate a "good" signal; yellow may indicate a "poor" or "low" signal; and red may indicate that there is no signal available. In one example, the wireless signal indicator 178 may be ON or active whenever the portable computer 100 is powered up. Alternatively, the wireless signal indicator 178 may be activated by a user action, for example, by pressing the navigation button 166 or another button or key provided on the portable computer 100, and may remain active for a predetermined time period (e.g., for 2 seconds, 10 seconds, one minute, etc.). As discussed above, the functionality of the navigation button 166 may vary depending on the configuration mode of the portable computer 100. In one example, when the portable computer 100 is in the closed position, but still powered up, the default action for the navigation button 166 may be to activate the wireless signal indicator 178.

Figure 19:
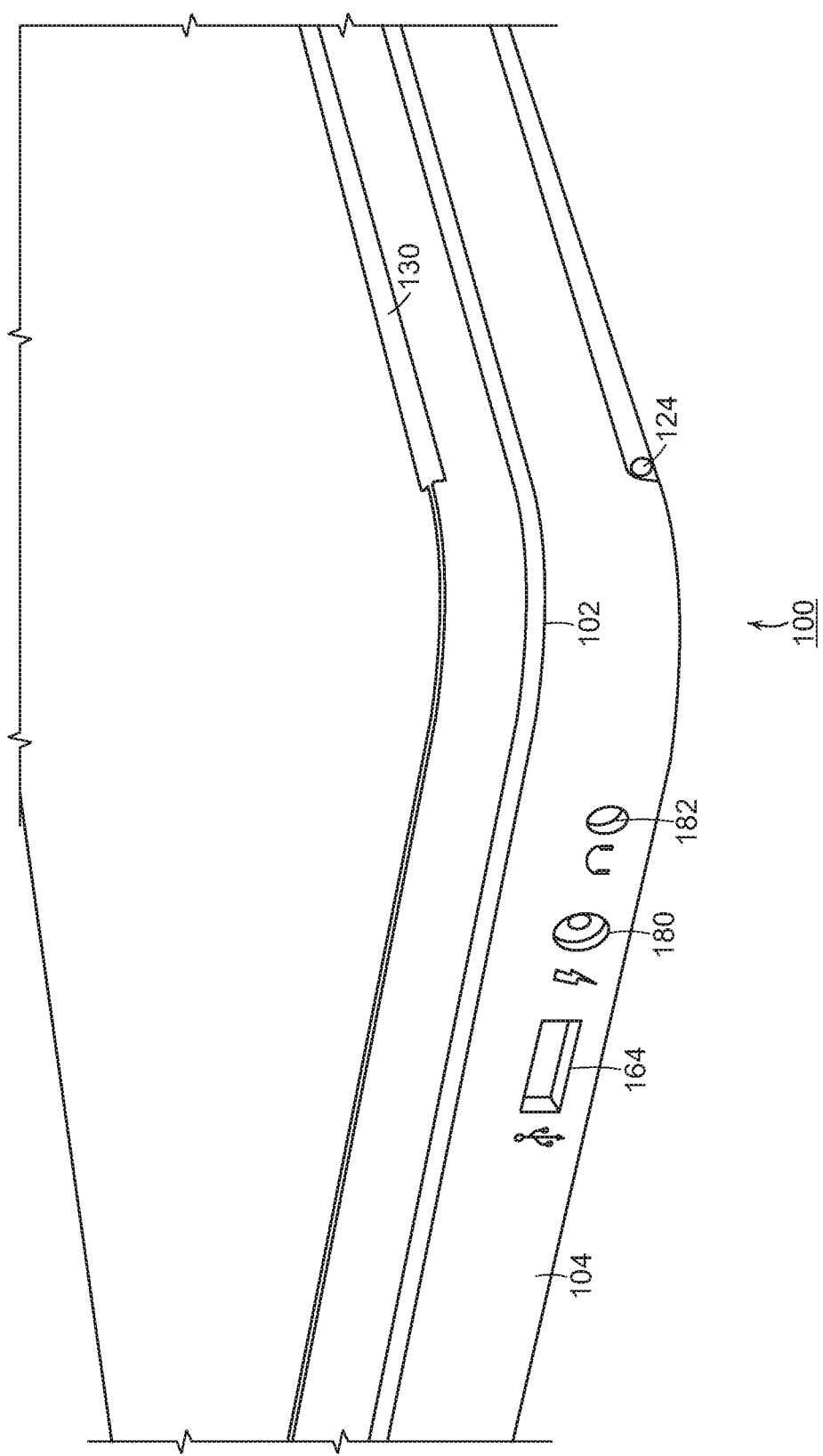
FIG. 19 is a view of a portion of the portable computer in the closed position, according to aspects of the invention.

According to one embodiment, the portable computer 100 may be provided with power cord and adapter to allow the portable computer to be plugged into a wall supply. Referring to FIG. 19, there is illustrated a view of a portion of the portable computer 100, showing a power jack 180 to which the power adaptor can be connected. As discussed above, the portable computer 100 may also include a port 164 to which peripheral devices, such as mouse, external keyboard, portable flash drive, memory stick, etc. may be connected. In one example, the port 164 is a USB port; however, it is to be appreciated that the port may accommodate protocols other than USB. In addition, although only one port 164 is illustrated in FIG. 19, the portable computer 100 may comprise multiple ports that may accommodate multiple protocols. In one example, the portable computer 100 may also comprise a headphone jack 182. It is to be appreciated that the location of any or all of the power jack 180, port(s) 164, and headphone jack 182 are not limited to the example shown in FIG. 19, but may be anywhere convenient or desirable on the portable computer 100.

Figure 20:
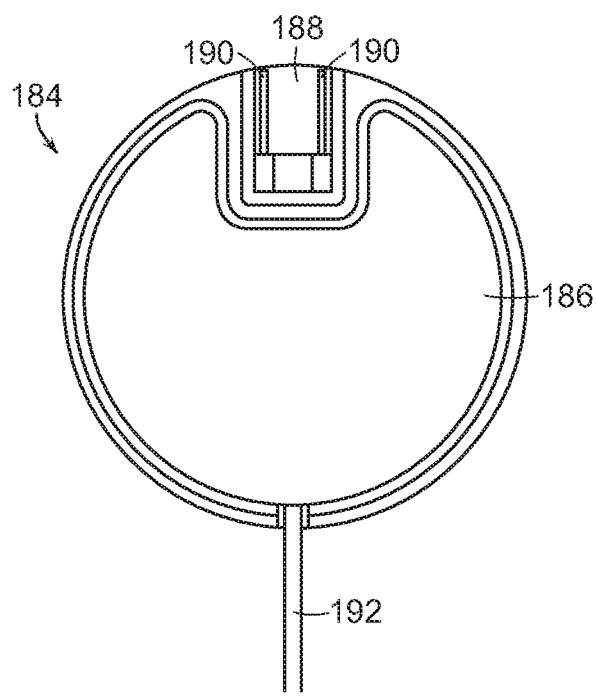
FIG. 20 is a plan view of one example of a power adaptor, according to aspects of the invention.
Figure 21:
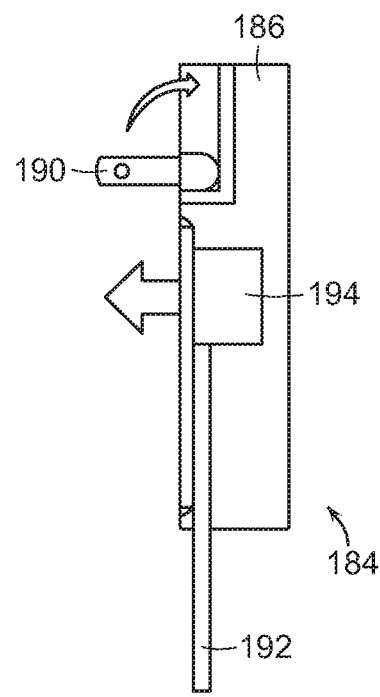
FIG. 21 is a side view of the power adaptor of FIG. 20.

Referring to FIG. 20, there is illustrated a top down view one example of a power adaptor 184 that may be used with the portable computer 100 and connected via the power jack 180. As known to those skilled in the art, the power adaptor 184 comprises a transformer (not shown) that converts the wall power to a level acceptable for use by the portable computer 100. In one embodiment, the power adaptor 184 comprises a substantially round body 186 that houses the transformer and other necessary components. A connector 188 may allow the power adaptor 184 to be connected to a wall outlet or extension cord. In one example, the connector 188 may include foldable prongs 190 that can be folded against the connector 188 for storage, and folded out for connection, as illustrated in FIG. 21. A cord 192 may be slidably accommodated within the body 186, such that the cord may be stored within the body and flexibly extended (up to its maximum length) by a user.

Figure 22A:
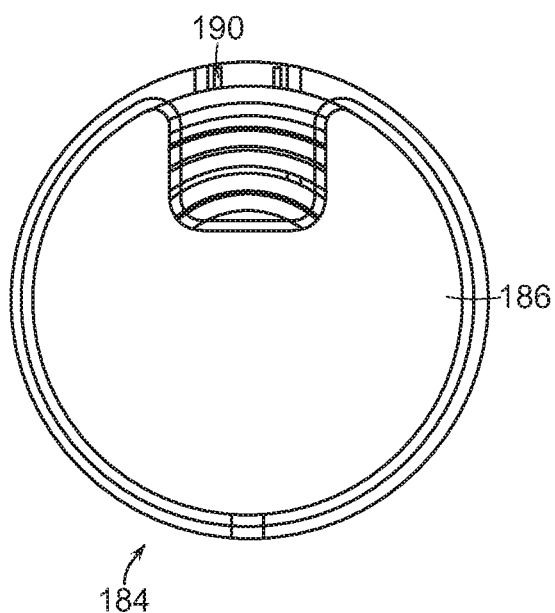
FIG. 22A is another side view of the power adaptor of FIG. 20, illustrating the power cord would around a cord spool, according to aspects of the invention.
Figure 22B:
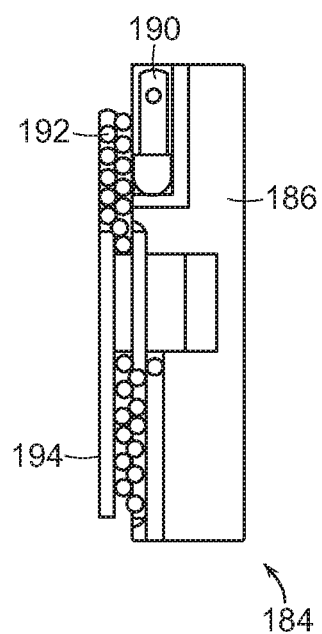
FIG. 22B is a plan view of the power adaptor of FIG. 22A.

According to one embodiment, the cord 192 may be wound around a cord spool 194 located within, or partially within, the body 186 of the power adaptor 184. As illustrated in FIG. 21, the cord spool 194 may be configured to slide out from the body 186 of the power adaptor 184, such that the cord 192 can be wound around the cord spool 194, as illustrated in FIGS. 22A and 22B.

Figure 23:
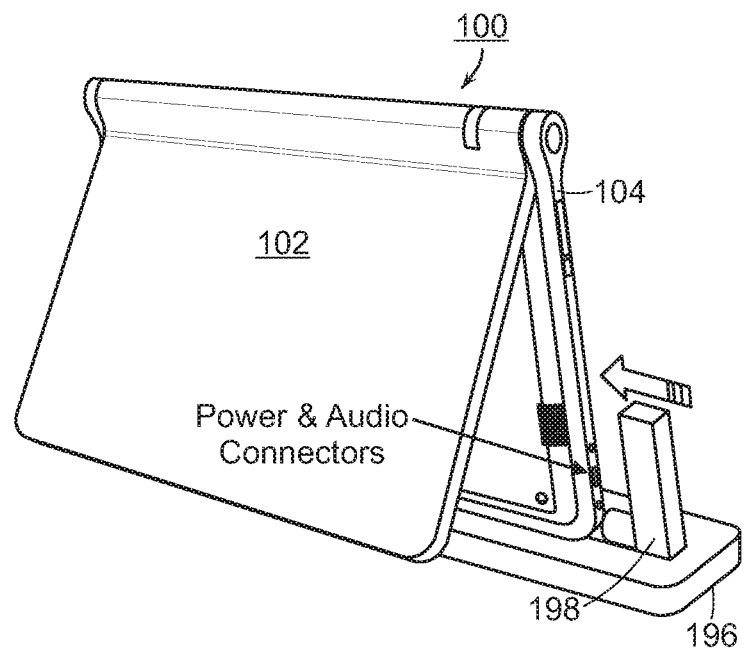
FIG. 23 is an illustration of the portable computer coupled to a docking station, according to aspects of the invention.
Figure 24:
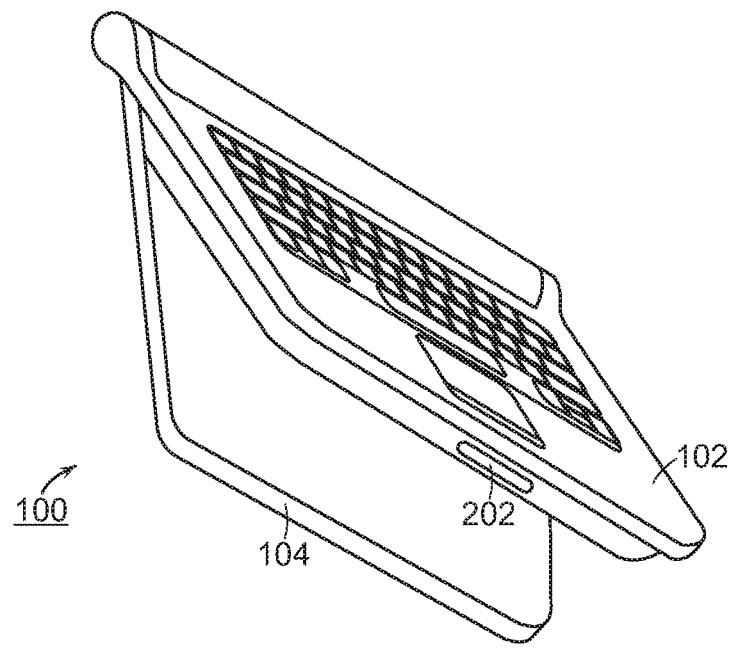
FIG. 24 is an illustration of the portable computer showing one example of a docking connector, according to aspects of the invention.

According to another embodiment, the portable computer 100 may be configured to connect to a docking station 196, as illustrated in FIG. 23. In one embodiment, a connector 198 on the docking station 196 may be configured to slidably connect to connectors 200 on the portable computer 100, as illustrated in FIG. 23. In one example, the connectors 200 may include power and audio connectors, such that the portable computer 100 may receive power from the docking station and receive and/or provide audio signals from/to the docking station, respectively. For example, the docking station may be coupled to external speakers, and the portable computer may provide audio signals to the docking station to be played through the external speakers. In another example, the docking station 196 may also be coupled to an audio device (not shown), such as an MP3 player, which may provide audio signals and data to the portable computer 100, for example, to update an audio library on the portable computer. It is to be appreciated that many other variations of communication between the portable computer 100 and devices coupled to the docking station 196 are possible, as would be recognized by those skilled in the art, and such variations are intended to be within the scope of this disclosure. Furthermore, numerous variations on the connector(s) 198, 200 that couple the docking station 196 to the portable computer 100 are also possible, as would be recognized by those skilled in the art. For example, the portable computer 100 may include a multi-pin connector 202 located on the base 104, as illustrated in FIG. 24. Such and other variations are intended to be within the scope of this disclosure and the above-mentioned examples are provided for illustration only and are not intended to be limiting.

Figure 26:
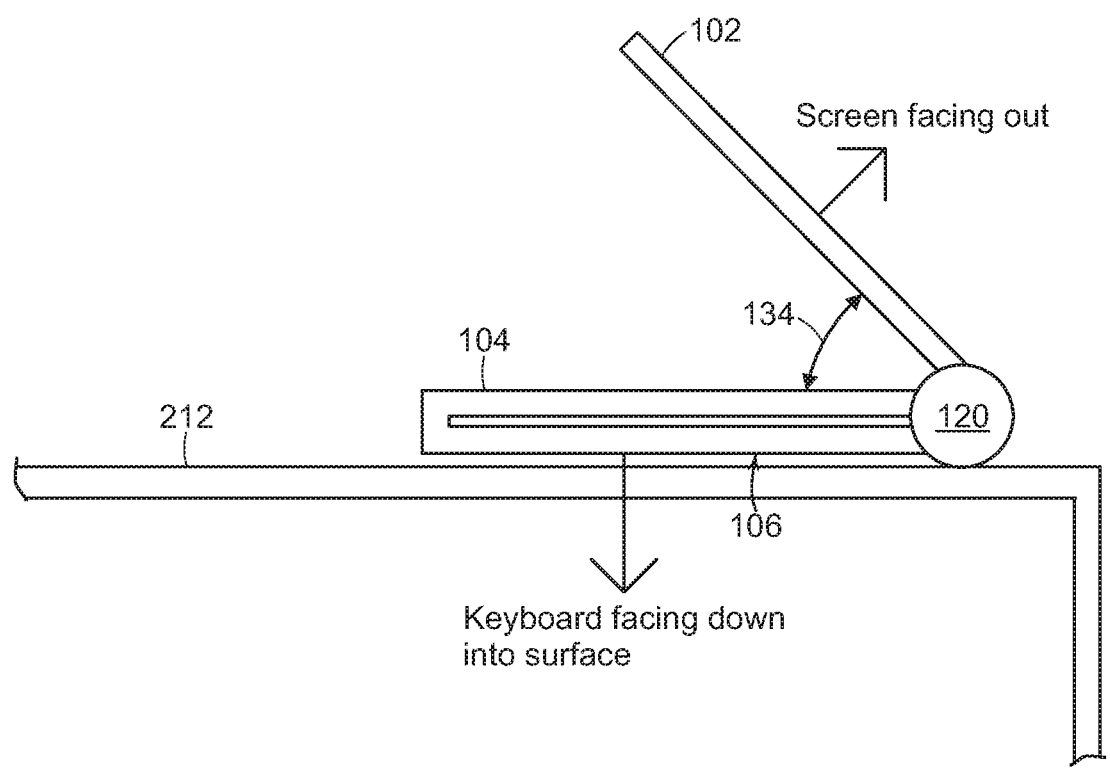
FIG. 26 is an illustration of the portable computer configured into a "frame" mode, according to aspects of the invention.

In addition, it is to be appreciated that although the above discussion refers primarily to the portable computer 100 being in either the laptop mode or easel mode, other modes or configurations are also possible. For example, as discussed above, because the portable computer 100 can be configured from the closed position, through the laptop mode into the easel mode by rotating the display component 102, a number of configurations are possible in between "true" laptop mode and "true" easel mode. In another example, the portable computer 100 may be configured into a "frame" mode, as illustrated in FIG. 26, in which the portable computer is placed on a surface 212 with the keyboard 106 "face down" on the surface 212 and the display 110 facing upward. In the frame mode, the display component 102 may be at a similar orientation, and angle 134, with respect to the base component 104 as in the easel mode. However, rather than the base component 104 and display component 102 being oriented vertically with respect to the surface 212, as in the easel mode (in which the portable computer forms an inverted "V" as discussed above), in the frame mode, the base component 104 may lie flat on the surface 212, as shown in FIG. 26. In one example, software and/or hardware protection may be provided for the keyboard to prevent keys from being pressed (or to prevent the portable computer from responding to pressed keys) when the portable computer is in the frame mode.

Figure 27:
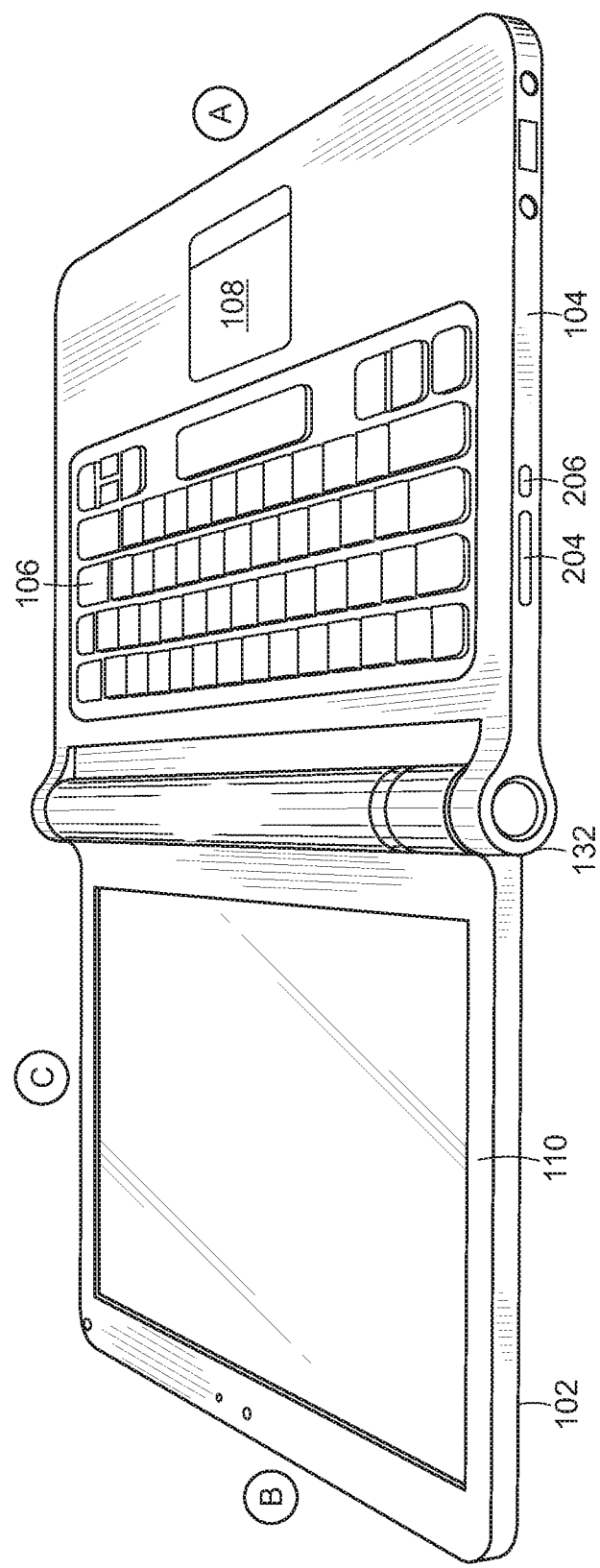
FIG. 27 is an illustration of the portable computer configured into a "flat" mode, according to aspects of the invention.

Similarly, referring to FIG. 27, there is illustrated another configuration of the portable computer 100, referring to as the "flat" mode. In the flat mode, the display component 102 may be rotated (or opened) to approximately 180 degrees with respect to the base component 104, such that the base component and display component lay flat on a surface, with the keyboard 106 and display screen 110 exposed, as shown in FIG. 27. Unlike the easel and frame modes, in which the keyboard may be concealed and not easily accessible, in the flat mode, the keyboard is accessible and usable. In addition, as discussed above, the visual display on the display screen 110 may be automatically rotated to accommodate comfortable viewing of information by persons located in different positions relative to the base component 104 or display component 102. The visual display on the display screen 110 may also be manually adjusted by a user using, for example, the keyboard 106, touch pad 108 or mouse (not shown), scroll wheel 132 or navigation buttons (not shown). For example, if a user (located at position A) wishes to display information for a person located opposite the user (at position B), the visual display may be rotated (automatically or manually) 180 degrees such that the information appears "right-way-up," to the person at location B, even through the display screen 110 is upside-down for that person. Similarly, in another example, the visual display may be rotated (automatically or manually) 90 degrees such that the information appears "right-way-up," for a person at location C. In one example, a user can "toggle" the visual display among various orientations. For example, a user at location A may have the visual display facing themselves while using the keyboard 106 or other controls to change or access information on the display, then toggle the display orientation 180 or 90 degrees to display the information for persons at locations B or C.

In summary, various aspects and embodiments provide a portable computer that is configurable between different operating modes, including a laptop mode and an easel mode, and that is capable of different display formats and functionality in the different modes. The ability to view and operate the portable computer in the different laptop and easel modes, and to incorporate features and functions such as an alarm clock, digital photograph frame, voice-over-IP, etc, may provide enhanced flexibility and usefulness. In addition, the portable computer may include a graphical user interface that may work seamlessly with the computer hardware to provide an enjoyable, holistic user experience.

Having thus described several aspects of at least one embodiment, it is to be appreciated various alterations, modifications, and improvements will readily occur to those skilled in the art. For example functionality or features that have been described herein in connection with hardware may instead be implemented in software, or vice versa. For example, the wireless signal indicator discussed above may instead (or in addition) be provided as a software application. Such alterations, modifications, and improvements are intended to be part of this disclosure and are intended to be within the scope of the invention. Accordingly, the foregoing description and drawings are by way of example only.

What is claimed is:

1. A non-transitory computer-readable medium having instructions encoded thereon that, when executed by at least one processor of a portable computer comprising a display component comprising a display screen, a keyboard, and an orientation sensor, cause the at least one processor to perform a method, the method comprising:
    receiving, from the orientation sensor, a first detection result indicating that the portable computer has transitioned from a first orientation, in which the display component is disposed at an angle between 0 degrees and 180 degrees with respect to the keyboard about a first axis that is parallel to one of a height dimension and a length dimension of the display screen, to a second orientation, in which the display component is disposed at an angle between 180 degrees and 320 degrees with respect to the keyboard about the first axis;
    rotating a visual display on the display screen by 180 degrees responsive to receiving the first detection result from the orientation sensor, wherein rotating the visual display on the display screen responsive to receiving the first detection result further comprises enlarging content in the visual display on the display screen;
    receiving, from the orientation sensor, a second detection result indicating that the portable computer has transitioned from the second orientation to a third orientation, in which the display component is disposed at an angle between 180 degrees and 320 degrees with respect to the keyboard and the display component is rotated about the first axis by at least 180 degrees relative to the second orientation; and
    rotating the visual display on the display screen by 180 degrees responsive to receiving the second detection result from the orientation sensor.

2. The non-transitory computer-readable medium of claim 1, wherein the orientation sensor includes an accelerometer.

3. The non-transitory computer-readable medium of claim 1, wherein the method further comprises:
    receiving, from the orientation sensor, a third detection result indicating that the portable computer has transitioned from the third orientation to the first orientation; and,
    maintaining an orientation of the visual display on the display screen responsive to receiving the third detection result from the orientation sensor.

4. The non-transitory computer-readable medium of claim 1, wherein the method further comprises transitioning the portable computer from a first mode to a second mode, in which the visual display is rotated 180 degrees with respect to the visual display in the first mode, responsive to receiving the first detection result.

5. The non-transitory computer-readable medium of claim 4, wherein the first mode is a laptop mode and the second mode is an easel mode.

6. The non-transitory computer-readable medium of claim 4, wherein the method further comprises transitioning the portable computer from the second mode to a third mode, in which the visual display is rotated 180 degrees with respect to the visual display in the second mode, responsive to receiving the second detection result.

7. The non-transitory computer-readable medium of claim 6, wherein the first mode is a laptop mode, the second mode is an easel mode, and the third mode is a frame mode.

8. The non-transitory computer-readable medium of claim 6, wherein the method further comprises, in the third mode, preventing the portable computer from responding to pressed keys of the keyboard.

9. A method of operating a portable computer that comprises at least one processor, a display component comprising a display screen, a keyboard, and an orientation sensor, the method comprising:
receiving, by the at least one processor from the orientation sensor, a first detection result indicating that the portable computer has transitioned from a first orientation, in which the display component is disposed at an angle between 0 degrees and 180 degrees with respect to the keyboard about a first axis that is parallel to one of a height dimension and a length dimension of the display screen, to a second orientation, in which the display component is disposed at an angle between 180 degrees and 320 degrees with respect to the keyboard about the first axis;
rotating, by the at least one processor, a visual display on the display screen by 180 degrees responsive to receiving the first detection result from the orientation sensor, wherein rotating the visual display on the display screen responsive to receiving the first detection result further comprises enlarging content in the visual display on the display screen;
receiving, by the at least one processor from the orientation sensor, a second detection result indicating that the portable computer has transitioned from the second orientation to a third orientation, in which the display component is disposed at an angle between 180 degrees and 320 degrees with respect to the keyboard and the display component is rotated about the first axis by at least 180 degrees relative to the second orientation; and
rotating, by the at least one processor, the visual display on the display screen by 180 degrees responsive to receiving the second detection result from the orientation sensor.

10. The method of claim 9, wherein the orientation sensor includes an accelerometer.

11. The method of claim 9, further comprising:
receiving, by the at least one processor from the orientation sensor, a third detection result indicating that the portable computer has transitioned from the third orientation to the first orientation; and,
maintaining, by the at least one processor, an orientation of the visual display on the display screen responsive to receiving the third detection result from the orientation sensor.

12. The method of claim 9, further comprising transitioning, by the at least one processor, the portable computer from a first mode to a second mode, in which the visual display is rotated 180 degrees with respect to the visual display in the first mode, responsive to receiving the first detection result.

13. The method of claim 12, wherein the first mode is a laptop mode and the second mode is an easel mode.

14. The method of claim 12, further comprising transitioning, by the at least one processor, the portable computer from the second mode to a third mode, in which the visual display is rotated 180 degrees with respect to the visual display in the second mode, responsive to receiving the second detection result.

15. The method of claim 14, wherein the first mode is a laptop mode, the second mode is an easel mode, and the third mode is a frame mode.

16. The method of claim 14, further comprising, by the at least one processor, in the third mode, preventing the portable computer from responding to pressed keys of the keyboard.

17. A portable computer comprising:
a display component comprising a display screen;
a keyboard;
an orientation sensor; and
at least one processor configured to:
receive, from the orientation sensor, a first detection result indicating that the portable computer has transitioned from a first orientation, in which the display component is disposed at an angle between 0 degrees and 180 degrees with respect to the keyboard about a first axis that is parallel to one of a height dimension and a length dimension of the display screen, to a second orientation, in which the display component is disposed at an angle between 180 degrees and 320 degrees with respect to the keyboard about the first axis;
rotate a visual display on the display screen by 180 degrees responsive to receiving the first detection result from the orientation sensor, wherein rotating the visual display on the display screen responsive to receiving the first detection result further comprises enlarging content in the visual display on the display screen;
receive, from the orientation sensor, a second detection result indicating that the portable computer has transitioned from the second orientation to a third orientation, in which the display component is disposed at an angle between 180 degrees and 320 degrees with respect to the keyboard and the display component is rotated about the first axis by at least 180 degrees relative to the second orientation; and
rotate the visual display on the display screen by 180 degrees responsive to receiving the second detection result from the orientation sensor.

18. The portable computer of claim 17, wherein the orientation sensor includes an accelerometer.

19. The portable computer of claim 17, wherein the at least one processor is further configured to:
receive, from the orientation sensor, a third detection result indicating that the portable computer has transitioned from the third orientation to the first orientation; and,
maintain an orientation of the visual display on the display screen responsive to receiving the third detection result from the orientation sensor.

20. The portable computer of claim 17, wherein the at least one processor is further configured to transition the portable computer from a first mode to a second mode, in which the visual display is rotated 180 degrees with respect to the visual display in the first mode, responsive to receiving the first detection result.

21. The portable computer of claim 20, wherein the first mode is a laptop mode and the second mode is an easel mode.

22. The portable computer of claim 20, wherein the at least one processor is further configured to transition the portable computer from the second mode to a third mode, in which the visual display is rotated 180 degrees with respect to the visual display in the second mode, responsive to receiving the second detection result.

23. The portable computer of claim 22, wherein the first mode is a laptop mode, the second mode is an easel mode, and the third mode is a frame mode.

24. The portable computer of claim 22, wherein the at least one processor is further configured to, in the third mode, prevent the portable computer from responding to pressed keys of the keyboard.

* * * * *